United States Patent
Ogura

(10) Patent No.: US 10,995,967 B2
(45) Date of Patent: May 4, 2021

(54) CONTROL APPARATUS AND AIR CONDITIONING SYSTEM

(71) Applicant: Mitsubishi Electric Corporation, Tokyo (JP)

(72) Inventor: Kazutaka Ogura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/481,269

(22) PCT Filed: Mar. 31, 2017

(86) PCT No.: PCT/JP2017/013628
§ 371 (c)(1),
(2) Date: Jul. 26, 2019

(87) PCT Pub. No.: WO2018/179349
PCT Pub. Date: Oct. 4, 2018

(65) Prior Publication Data
US 2020/0033016 A1 Jan. 30, 2020

(51) Int. Cl.
*G05B 15/02* (2006.01)
*F24F 11/30* (2018.01)
(Continued)

(52) U.S. Cl.
CPC .............. *F24F 11/30* (2018.01); *F24F 11/52* (2018.01); *F24F 11/54* (2018.01); *F24F 11/56* (2018.01);
(Continued)

(58) Field of Classification Search
CPC .. F24F 11/30; F24F 11/74; F24F 11/64; F24F 11/56; F24F 11/52; F24F 11/54; F24F 11/79; G05B 15/02
See application file for complete search history.

(56) References Cited

U.S. PATENT DOCUMENTS

| 2010/0010680 A1* | 1/2010 | Nishino | F24F 9/00 700/282 |
| 2012/0288363 A1* | 11/2012 | Yumoto | F24F 13/14 415/182.1 |

(Continued)

FOREIGN PATENT DOCUMENTS

| EP | 2495506 A1 | 9/2012 |
| EP | 2918929 A1 | 9/2015 |

(Continued)

OTHER PUBLICATIONS

International Search Report of the International Searching Authority dated May 16, 2017 for the corresponding International application No. PCT/JP2017/013628 (and English translation).

(Continued)

*Primary Examiner* — Christopher E. Everett
(74) *Attorney, Agent, or Firm* — Posz Law Group, PLC

(57) ABSTRACT

A control apparatus controls at least one of a wind direction and a wind volume of a plurality of air conditioners provided with air outlets. The control apparatus includes: a storage unit that stores arrangement information indicating an arrangement of each air conditioner and function information indicating a function of each air conditioner; a display unit that displays a layout screen including the arrangement information; and an input unit that receives an operation specifying a reach position of wind blown out from two or more of the air outlets in association with the layout screen. The control apparatus also includes a controller that controls at least one of the wind direction and the wind volume of two or more of the air outlets based on the information indicating the reach position received by the input unit, the arrangement information, and the function information.

18 Claims, 22 Drawing Sheets

(51) Int. Cl.
  *F24F 11/74* (2018.01)
  *F24F 11/64* (2018.01)
  *F24F 11/56* (2018.01)
  *F24F 11/52* (2018.01)
  *F24F 11/54* (2018.01)
  *F24F 11/79* (2018.01)

(52) U.S. Cl.
  CPC ............. *F24F 11/64* (2018.01); *F24F 11/74* (2018.01); *F24F 11/79* (2018.01); *G05B 15/02* (2013.01)

(56) References Cited

U.S. PATENT DOCUMENTS

| | | | | |
|---|---|---|---|---|
| 2014/0005838 A1* | 1/2014 | Ogura | ................... | F24F 11/30 700/276 |
| 2014/0081467 A1* | 3/2014 | Sato | ................... | F24F 3/065 700/276 |
| 2015/0330649 A1* | 11/2015 | Nishii | ................... | F24F 11/30 700/276 |
| 2018/0135879 A1 | 5/2018 | Ota et al. | | |

FOREIGN PATENT DOCUMENTS

| | | |
|---|---|---|
| JP | 2010-261643 A | 11/2010 |
| JP | 4715947 B2 | 7/2011 |
| JP | 2013-076493 A | 4/2013 |
| JP | 2014-190686 A | 10/2014 |
| JP | 5836741 B2 | 12/2015 |
| WO | 2011/016225 A1 | 2/2011 |
| WO | 2016203538 A1 | 12/2016 |

OTHER PUBLICATIONS

Extended European Search Report dated Feb. 28, 2020 issued in corresponding EP patent application No. 17903257.8.

* cited by examiner

CONTROL APPARATUS AND AIR CONDITIONING SYSTEM

CROSS REFERENCE TO RELATED APPLICATION

This application is a U.S. national stage application of International Application No. PCT/JP2017/013628, filed on Mar. 31, 2017, the contents of which are incorporated herein by reference.

TECHNICAL FIELD

The present invention relates to a control apparatus that operates and manages an air conditioner, and also to an air conditioning system.

BACKGROUND

In the related art, a control apparatus provided with a pointing device such as a touch panel and capable of operating and managing an air conditioner is known (for example, see Patent Literature 1 and 2). The control apparatus of Patent Literature 1 is configured such that when a user performs a touch operation on a layout screen illustrating a space where a single indoor unit is installed, the control apparatus sets the direction of wind blown out from the indoor unit according to the touched position or area. Also, the control apparatus of Patent Literature 2 is configured such that, on a layout screen that includes the installed position of an indoor unit with four air outlets, the direction of wind blown out from each air outlet is individually adjustable.

PATENT LITERATURE

Patent Literature 1: Japanese Patent No. 5836741
Patent Literature 2: Japanese Patent No. 4715947

However, the control apparatus of the related art like in Patent Literature 1 and 2 are unable to adjust the wind direction of one air outlet of a single air conditioner with a single operation. In other words, in the control apparatus of the related art, in the case of adjusting the wind direction of multiple air conditioners, since it is necessary to make the adjustment for one air conditioner or one air outlet at a time, multiple operations become necessary, which makes operation more complicated and is problematic by lacking convenience.

SUMMARY

The present invention has been devised in order to solve problems like the above, and an objective thereof is to provide a control apparatus and an air conditioning system with excellent ease-of-use that achieves collective operation of the wind direction of each of multiple air conditioners.

A control apparatus according to one embodiment of the present invention is a control apparatus that controls at least one of a wind direction and a wind volume of a plurality of air conditioners provided with air outlets, and includes: a storage unit configured to store arrangement information indicating an arrangement of each air conditioner and function information indicating a function of each air conditioner; a display unit configured to display a layout screen including the arrangement information; an input unit configured to receive an operation specifying a reach position of wind blown out from two or more of the air outlets in association with the layout screen; and a controller configured to control at least one of the wind direction and the wind volume of two or more of the air outlets based on the information indicating the reach position received by the input unit, the arrangement information, and the function information.

An air conditioning system according to another embodiment of the present invention is provided with multiple air conditioners and the above control apparatus. Also, an air conditioning system according to another embodiment of the present invention includes a plurality of air conditioners, a central management device that controls the air conditioners in a centralized manner, and the above control apparatus that communicates with the central management device in a wired or wireless manner, in which the controller controls the plurality of air conditioners through the central management device.

According to the present invention, by receiving an operation specifying a reach position of wind blown out from two or more air outlets in association with a layout screen, it is possible to control the wind blown out from multiple air outlets with a single operation, thereby making it possible to achieve collective wind direction control and wind volume control with respect to multiple air outlets.

DETAILED DESCRIPTION

Embodiment 1

Figure 1:
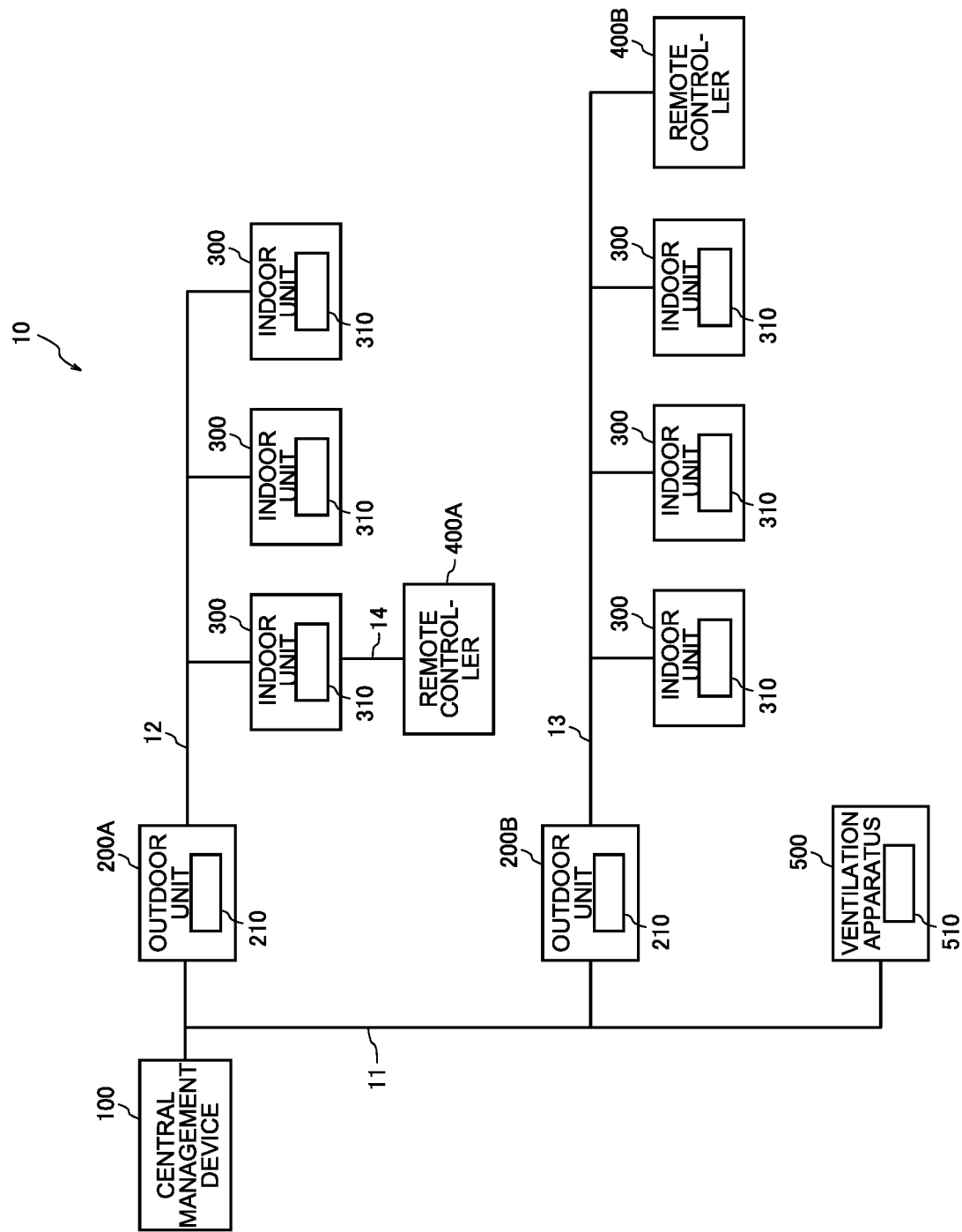
FIG. 1 is a block diagram illustrating an exemplary configuration of an air conditioning system according to Embodiment 1 of the present invention.

FIG. 1 is a block diagram illustrating an exemplary configuration of an air conditioning system according to Embodiment 1 of the present invention. As illustrated in FIG. 1, the air conditioning system 10 includes a central management device 100, an outdoor unit 200A, an outdoor unit 200B, six indoor units 300, a remote controller 400A, a remote controller 400B, and a ventilation apparatus 500.

In the example of FIG. 1, the central management device 100 is connected to the outdoor unit 200A, the outdoor unit 200B, and the ventilation apparatus 500 through a communication wire 11. In other words, the central management device 100, the outdoor unit 200A, the outdoor unit 200B, and the ventilation apparatus 500 are able to communicate with each other.

The outdoor unit 200A is connected to three of the indoor units 300 through a communication wire 12, and the outdoor unit 200A and each indoor unit 300 are able to communicate with each other. The outdoor unit 200B is connected to three of the indoor units 300 and the remote controller 400B through a communication wire 13, with the outdoor unit 200B, each indoor unit 300, and the remote controller 400B are able to communicate with each other. The remote controller 400A is connected to one of the indoor units 300 connected to the outdoor unit 200A through a communication wire 14. The six indoor units 300 may be provided in the same air-conditioning target space, or may be provided in different air-conditioning target spaces one unit at a time or multiple units at a time.

Each of the outdoor unit 200A and the outdoor unit 200B includes a compressor 220 (not illustrated in FIG. 1) and an outdoor heat exchanger (not illustrated). Each indoor unit 300 includes a pressure-reducing device 320 (not illustrated in FIG. 1) and an indoor heat exchanger (not illustrated). The compressor 220 includes a compressor motor (not illustrated) driven by an inverter for example, and compresses refrigerant. The outdoor heat exchanger is configured as a fin-and-tube heat exchanger for example, and causes heat to be exchanged between refrigerant and outdoor air. The pressure-reducing device 320 is configured as an electronic expansion valve for example, and causes refrigerant to expand and be decompressed. The indoor heat exchanger is configured as a fin-and-tube heat exchanger for example, and causes heat to be exchanged between refrigerant and air inside the air-conditioning target space.

In other words, the outdoor unit 200A and three of the indoor units 300 form a refrigerant circuit by the connection of the compressor 220, the outdoor heat exchanger, the pressure-reducing device 320, and the indoor heat exchanger through refrigerant pipes. Similarly, the outdoor unit 200B and three of the indoor units 300 form a refrigerant circuit by the connection of the compressor 220, the outdoor heat exchanger, the pressure-reducing device 320, and the indoor heat exchanger through refrigerant pipes. In other words, each indoor unit 300 cooperates with an outdoor unit 200 connected by a refrigerant pipe to adjust the air environment, such as the temperature, humidity, and cleanliness of the air in the air-conditioning target space. In the following, the outdoor unit 200A and the outdoor unit 200B will be collectively referred to as the outdoor unit 200.

Also, each indoor unit 300 includes a fan 330 (not illustrated in FIG. 1) that adjusts the strength of wind blown out from an air outlet, or in other words the wind volume of the air outlet. The fan 330 is attached to the indoor heat exchanger and sends air to the indoor heat exchanger. Although none is illustrated, the fan 330 includes a fan motor driven by an inverter for example and a fan that rotates by using the fan motor as a power source and sends air to the indoor heat exchanger.

Furthermore, each indoor unit 300 includes an air inlet (not illustrated) that sucks air in and an air outlet (not illustrated) that blows air out. Additionally, each indoor unit 300 includes a suction temperature sensor (not illustrated) configured as a thermistor for example that measures the temperature of air sucked in from the air inlet. Also, each indoor unit 300 includes a wind direction adjustment mechanism (not illustrated) that adjusts the direction of the wind blown out from the air outlet, or in other words the wind direction of the air outlet.

In Embodiment 1, although none is illustrated in FIG. 1, the wind direction adjustment mechanism includes a vertical flap 340 that adjusts the direction of wind in the vertical direction, a vertical driving unit 340a that drives the vertical flap 340, a horizontal louver 350 that adjusts the direction of wind in the horizontal direction, and a horizontal driving unit 350a that drives the horizontal louver 350. The vertical driving unit 340a and the horizontal driving unit 350a comprise a stepping motor for example.

Each of outdoor units 200A and 200B includes an outdoor controller 210 that controls the action of actuators such as the compressor 220. Each of the indoor units 300 includes an indoor controller 310 that controls the action of actuators such as the fan.

The outdoor controller 210 includes a function of communicating with the central management device 100, each indoor controller 310, and the remote controllers 400A and 400B. Also, the outdoor controller 210 of the outdoor unit 200A and the outdoor controller 210 of the outdoor unit 200B are able to communicate with each other. The indoor controller 310 includes a function of communicating with the central management device 100, each outdoor controller 210, and the remote controllers 400A and 400B.

Each outdoor controller 210 controls the operation of the outdoor unit 200A or the outdoor unit 200B containing itself according to a control signal from the central management device 100, the remote controller 400A, or the remote controller 400B. Each indoor controller 310 controls the operation of the indoor unit 300 containing itself according to a control signal from the central management device 100, the remote controller 400A, or the remote controller 400B.

The remote controller 400A is for operating and managing the outdoor unit 200A and the three indoor units 300 connected to the outdoor unit 200A. By operating the remote controller 400A, a user is able to adjust settings such as the wind direction, wind volume, and set temperature of each indoor unit 300 connected to the outdoor unit 200A. The remote controller 400B is for operating and managing the outdoor unit 200B and the three indoor units 300 connected to the outdoor unit 200B. By operating the remote controller 400B, a user is able to adjust settings such as the wind direction, wind volume, and set temperature of each indoor unit 300 connected to the outdoor unit 200B. Of course, it may also be configured such that the outdoor unit 200B and the three indoor units 300 connected to the outdoor unit 200B may be operated and managed from the remote controller 400A. Similarly, it may also be configured such that the outdoor unit 200A and the three indoor units 300 connected to the outdoor unit 200A may be operated and managed from the remote controller 400B. In the following, the remote controller 400A and the remote controller 400B will be collectively referred to as the remote controller 400.

The ventilation apparatus 500 is an apparatus that replaces air in the air-conditioning target space with outdoor air. The ventilation apparatus 500 includes an air outlet (not illustrated) that blow air out and a ventilation controller 510 that controls the action of various actuators provided internally. The ventilation controller 510 includes a function of communicating with at least the central management device 100. The ventilation controller 510 controls the operation of the ventilation apparatus 500 according to a control signal from the central management device 100.

Herein, each of the indoor units 300 and the ventilation apparatus 500 corresponds to an "air conditioner" of the present invention. For this reason, in the following description, the indoor units 300 and the ventilation apparatus 500 will be collectively referred to as the "air conditioner".

FIG. 1 illustrates an example of a case in which facility apparatus such as the outdoor unit 200, the indoor unit 300, the remote controller 400, and the ventilation apparatus 500 are connected to the central management device 100, but the configuration is not limited thereto. For example, as the "air conditioner" of the present invention, an apparatus such as an integrated air conditioner combining the functions of an indoor unit and the functions of an outdoor unit, an air purifier that removes particles such as dust floating in the air, or a humidifier that humidifies the air in the air-conditioning target space may also be connected to the central management device 100. In addition, facility apparatus such as a water heater, a floor heater, a television, a digital television, a DVD recorder, a stereo, and lighting apparatus may also be connected to the central management device 100, and these apparatus may be operated through the central management device 100.

Figure 2:
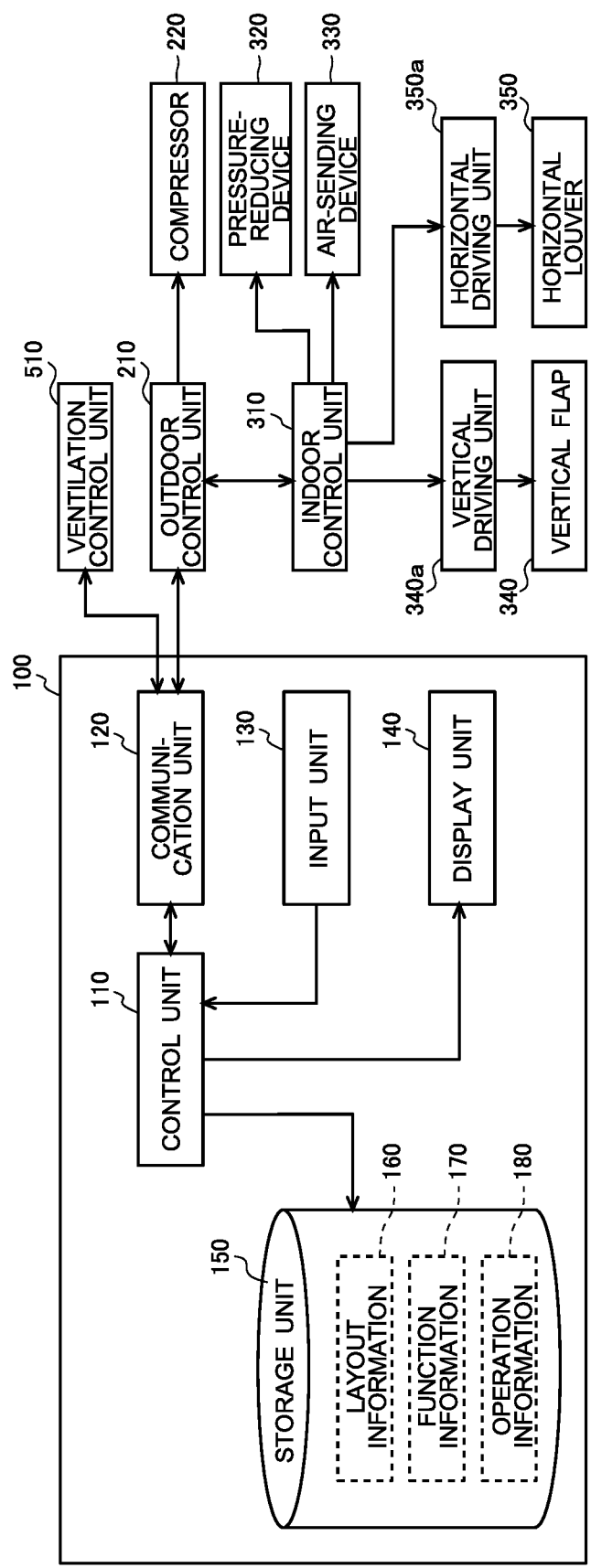
FIG. 2 is a block diagram illustrating an example of a functional configuration of the central management device of FIG. 1, and each actuator of the air conditioner and the indoor units.

FIG. 2 is a block diagram illustrating an example of a functional configuration of the central management device 100 of FIG. 1, and each actuator of the air conditioner and the indoor units. Since the outdoor unit 200A and the outdoor unit 200B are configured similarly and since the indoor units 300 are configured similarly to each other, in FIG. 2, for the sake of convenience, an internal configuration of the outdoor unit 200A and an internal configuration of a single indoor unit 300 are illustrated as an example.

The central management device 100 controls at least one of the direction and strength of the wind blown out from multiple air conditioners. The central management device 100 corresponds to a "control apparatus" of the present invention. As illustrated in FIG. 2, the central management device 100 includes a controller 110, a communication unit 120, an input unit 130, a display unit 140, and a storage unit 150.

The communication unit 120 communicates with the outdoor controller 210, the indoor controller 310, and the ventilation controller 510. The communication unit 120 may be configured by a dedicated communication wire or by any network interface such as a LAN interface.

The display unit 140 includes a liquid crystal display (LCD) for example, is controlled by the controller 110, and displays screens such as a layout screen reflecting arrangement information indicating the arrangement of each air conditioner, information indicating the operating state of each facility apparatus, or an operating screen for operating each facility apparatus.

The input unit 130 is an interface by which the user inputs operations to various facility apparatus. The input unit 130 receives an input operation by the user, and outputs a signal according to the content of the input operation to the controller 110. For example, the input unit 130 is able to receive an operation selecting a facility apparatus to be operated and an operation setting the control content of the selected facility apparatus. Also, the input unit 130 is able to collectively receive a wind direction operation for multiple air conditioners. In other words, the input unit 130 is able to receive an operation specifying a reach position of wind blown out from two or more air outlets in association with a layout screen.

In Embodiment 1, the input unit 130 and the display unit 140 are stacked on top of each other to form a touch panel. In other words, the input unit 130 is configured to detect a position touched by the user and output information indicating the detected position to the controller 110.

The storage unit 150 stores layout information 160, function information 170, and operation information 180. The layout information 160 includes images information of a layout diagram of the air-conditioning target space in which the air conditioners are arranged, information indicating the scale of the layout diagram, and facility apparatus position information, which indicates the position information of the facility apparatuses. The facility apparatus position information includes arrangement information indicating the arrangement of each facility apparatus. Also, in Embodiment 1, the facility apparatus position information includes information Wr indicating the range of reach of wind blown out from each air outlet.

Each facility apparatus holds function information indicating each function. In other words, the function information 170 is an aggregation of the function information indicating each function of each facility apparatus. Herein, the function information of an air conditioner is information indicating usable operation modes, the presence or absence of functions such as wind direction adjustment and wind volume adjustment, the installation angle of the air conditioner, the number of outlets, the direction of each outlet, the horizontal range angle, and a maximum distance of reach by the wind.

In the case of the indoor units 300, the usable operation modes include a cooling operation mode, a heating operation mode, and a defrosting operation mode. The information indicating the installation angle of the air conditioner is information indicating the angle of a reference orientation of the air conditioner with respect to a preset reference direction. In the case in which the air conditioner is provided with multiple air outlets, the reference orientation of the air conditioner is set to the direction of wind blown out straight ahead from a certain air outlet, for example. As one example, in the case in which the reference direction is set to north and the reference orientation of an installed air conditioner is northeast, the installation angle of the air conditioner becomes 45 degrees. In other words, in the case in which an indoor unit 300 has multiple air outlets, the installation angle of the indoor unit 300 is decided with reference to any of the air outlets, for example. Note that the function information 170 does not have to include information indicating the installation angle of the air conditioner.

The information indicating the number of outlets is information indicating the number of air outlets provided in an indoor unit 300, for example. The information indicating the direction of each outlet is information indicating the direction of each air outlet on the layout diagram, or in other words, the horizontal angle of each air outlet on the layout diagram. For example, in the case in which an indoor unit 300 is a ceiling-concealed cassette two-directional indoor unit in which two air outlets are disposed at opposing positions, if the direction of one of the air outlets is treated as a reference of "0 degrees", then the direction of the other air outlet is "180 degrees".

The information indicating the horizontal range angle is information indicating a range of angles in the horizontal direction of reach by air blown out from air outlets of an indoor unit 300, for example. The information indicating the maximum distance of reach by the wind is information indicating a maximum value of the distance of reach by air blown out from air outlets of an indoor unit 300, for example.

The operation information 180 is information indicating the operating state of each facility apparatus. The operation information 180 includes information indicating the operating state including being stopped, information indicating the operating mode, and information indicating the wind direction and wind volume of each facility apparatus.

The controller 110 controls the operation of each facility apparatus including multiple air conditioners. In other words, the controller 110 controls each facility apparatus based on the operation information 180 received through the communication unit 120, or a signal indicating the content of an operation input from the input unit 130. Also, the controller 110 is configured to receive information indicating the operating state of each facility apparatus through the communication unit 120, and cause the storage unit 150 to store the received information as the operation information 180. Furthermore, the controller 110 is configured to use the operation information 180 to display, on the display unit 140, information such as whether each facility apparatus is running or stopped, and information indicating the set state of the wind direction of each air conditioner. Also, the controller 110 acquires function information from each facility apparatus, and stores the acquired function information in the storage unit 150 as the function information 170.

In Embodiment 1, the controller 110 controls the start and stop of running, the setting and changing of the operating mode, and the adjustment of the wind direction and the wind volume for each indoor unit 300 and the ventilation apparatus 500. The controller 110 is able to control the wind direction of two or more air outlets based on information indicating a reach position received by the input unit 130, the arrangement information, and the function information 170.

The controller 110 causes the display unit 140 to display the layout screen. In Embodiment 1, the controller 110 uses the layout information 160 to display a layout screen including a layout diagram and information indicating the external appearance of the facility apparatus on the display unit 140.

Also, based on the information indicating the reach position, the arrangement information, and the function information 170, the controller 110 sets at least one piece of control content from among the wind direction and wind volume of two or more air outlets, and displays wind information Wj indicating the set control content in association with the arrangement information on the display unit 140. Furthermore, the controller reflects the information Wr indicating the range of reach of wind blown out from each of the air outlets on the layout screen displayed on the display unit. Additionally, the controller 110 controls at least one of the wind direction and the wind volume of two or more air outlets according to the positional relationship between the range information Wr and the information indicating the reach position.

Herein, each function of the controller 110 may be achieved by hardware such as a circuit device, and may also be achieved as software executed on a computational apparatus such as a microcontroller, a digital signal processor (DSP), or a central processing unit (CPU). Also, the storage unit 150 may be configured by a hard disk drive (HDD) or by programmable read-only memory (PROM) such as flash memory.

Figure 3:
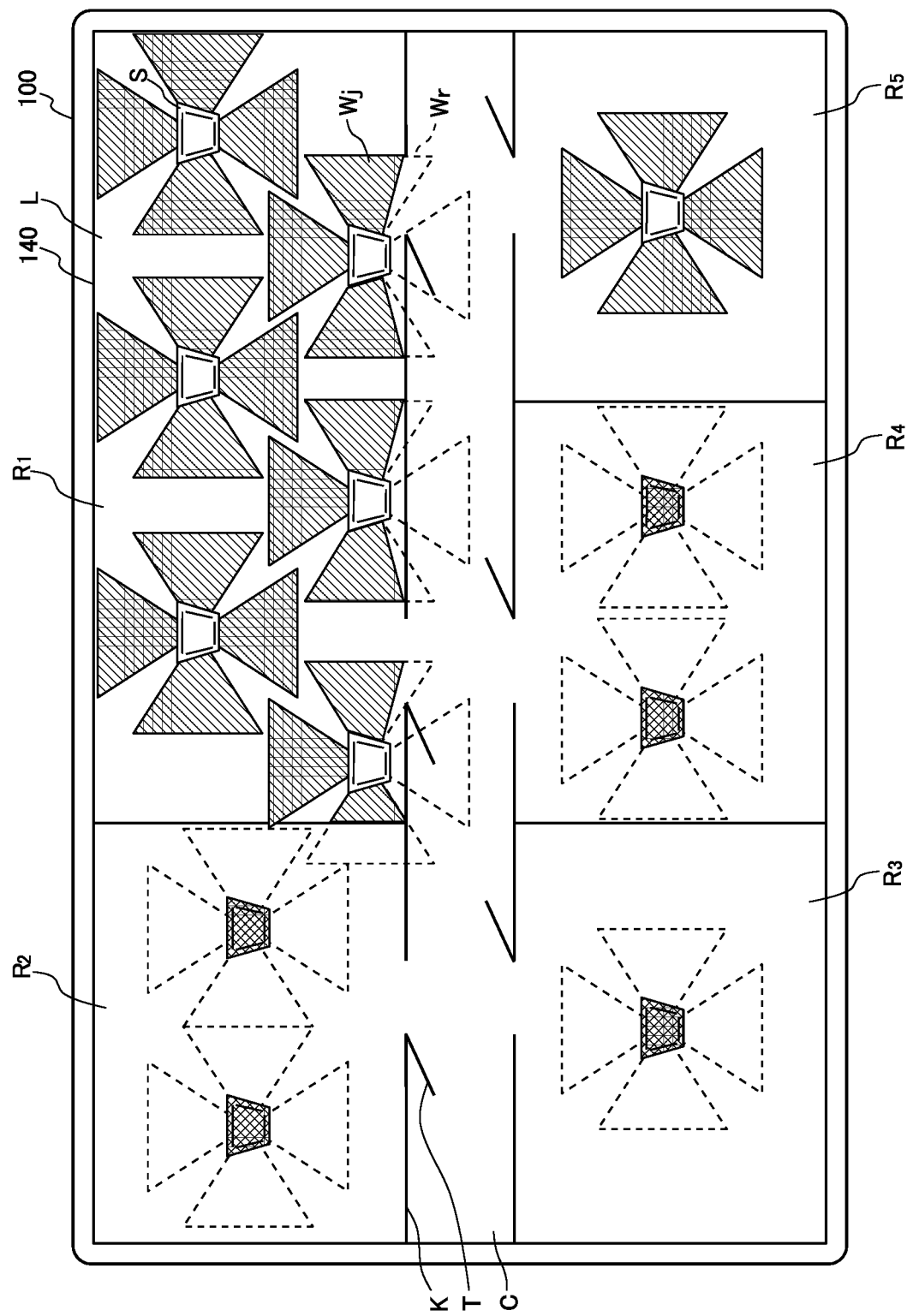
FIG. 3 is an explanatory diagram illustrating an exemplary layout screen displayed on the display unit of FIG. 2.

FIG. 3 is an explanatory diagram illustrating an exemplary layout screen displayed on the display unit of FIG. 2. The layout screen L is in a state in which each facility apparatus is arranged on the layout diagram. The controller 110 displays the layout screen L on the display unit 140 by using the layout information 160, the function information 170, and the operation information 180.

On the layout screen L, icons S that are information indicating the external appearance of each indoor unit 300, the information Wr indicating the range of reach of wind blown out from each of the air outlets of each indoor unit 300, and wind information Wj indicating the wind direction of each of the air outlets are displayed. Also, on the layout screen L, rooms $R_1$ to $R_5$, a corridor C, partitions K between rooms or between each room and the corridor C, and doors T are displayed as the layout diagram.

In other words, on the floor associated with the layout screen L, there are rooms $R_1$ to $R_5$ and a corridor C, and the room $R_1$ is provided with six indoor units 300 like the example in FIG. 1. Also, the room $R_2$ is provided with two indoor units 300, the room $R_3$ is provided with one indoor unit 300, the room $R_4$ is provided with two indoor units 300, and the room $R_5$ is provided with one indoor unit 300.

The controller 110 uses the layout information 160 indicating the layout diagram and the icons S on the display unit 140. Also, the controller 110 displays the information Wr indicating the range of reach of wind that is settable by the user on the display unit 140. Furthermore, the controller 110 uses the operation information 180 to cause the display unit 140 to display the wind information Wj. The wind information Wj is information indicating the currently set wind direction.

It is preferable to be able to confirm the operating state of the indoor units 300 at a glance, such as by displaying the icon S of a running indoor unit 300 in white and displaying the icon S of a stopped indoor unit 300 in black, for example. Note that in FIG. 3, the icons S of the running indoor units 300 are displayed in white, while the icons S of the stopped indoor units 300 are shaded with cross-hatching. The same also applies to the subsequent drawings hereinafter.

Also, for example, it is preferable to be able to distinguish between the range information Wr and the wind information Wj at a glance, such as by displaying the range information Wr in gray and displaying the wind information Wj in green, for example. Note that in FIG. 3, the portions enclosed by dashed lines correspond to the range information Wr, while the shaded portions enclosed by solid lines correspond to the wind information Wj. The same also applies to the subsequent drawings hereinafter. In the example of FIG. 3, the range information Wr is displayed as a trapezoidal region.

Figure 4:
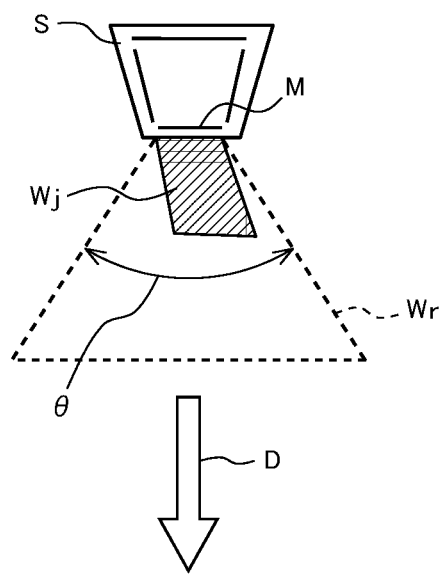
FIG. 4 is an explanatory diagram illustrating an icon of FIG. 3 and range information associated with one air outlet of the icon.

FIG. 4 is an explanatory diagram illustrating an icon of FIG. 3 and range information Wr associated with one air outlet of the icon. FIG. 4 will be referenced to describe the relationship between the range information Wr and the wind information Wj. In the icon S, four air outlets along the outer perimeter of a rectangular shape are illustrated simply with line segments, and in FIG. 4, one of these line segments indicating an air outlet is labeled "M" and will be used in the description.

As illustrated in FIG. 4, the direction of wind blown out straight ahead from the air outlet M is designated the direct wind direction D. Then, the horizontal direction with respect to the D direction of the wind information Wj indicates the horizontal range of reach by the wind blown out from the air outlet M, and corresponds to the angle setting of the horizontal louver 350. Also, the length in the D direction of the wind information Wj indicates the range in the direct wind direction D of reach by the wind blown out from the air outlet M, and in Embodiment 1, corresponds to the angle setting of the vertical flap 340. In other words, the horizontal width of the wind information Wj corresponds to the control of the horizontal louver 350 by the controller 110, while the length in the direct wind direction D of the wind information Wj corresponds to the control of the vertical flap 340 by the controller 110. Note that θ in FIG. 4 corresponds to the horizontal range angle described above.

Figure 5A:
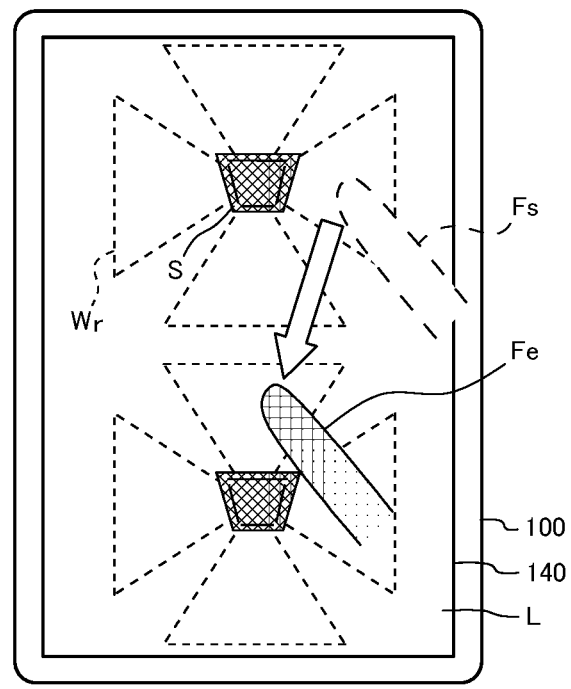
FIG. 5A is an explanatory diagram illustrating the state of a user operation in a state in which a part of the layout screen of FIG. 3 is enlarged.
Figure 5B:
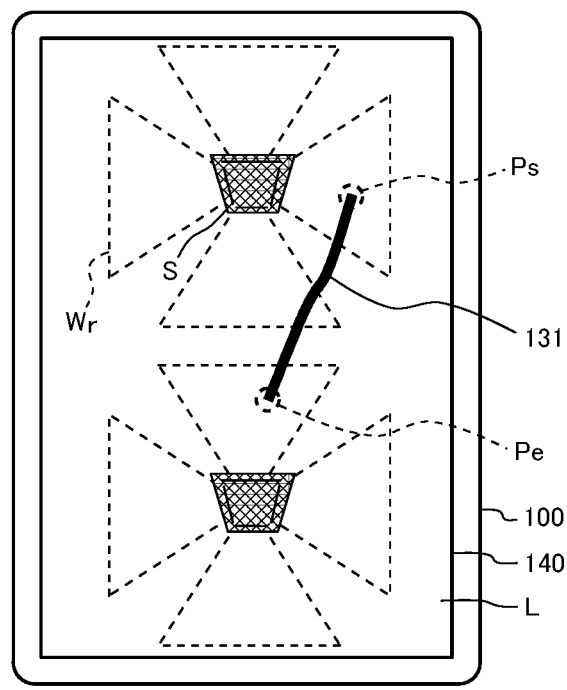
FIG. 5B is an explanatory diagram illustrating path information input through the layout screen of FIG. 5A.
Figure 5C:
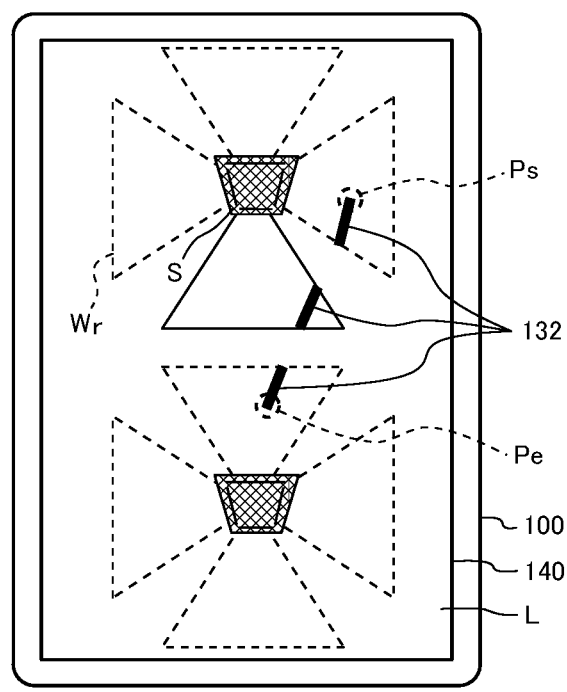
FIG. 5C is an explanatory diagram illustrating section data extracted from the path information of FIG. 5B.
Figure 5D:
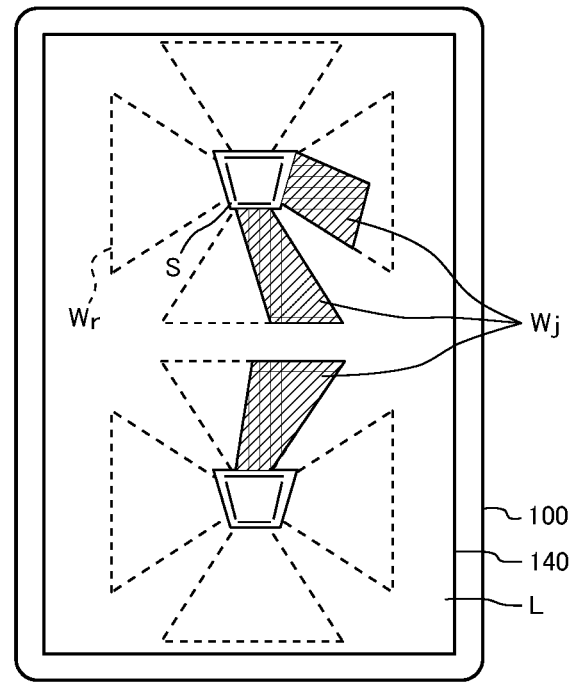
FIG. 5D is an explanatory diagram illustrating wind information created based on the section data of FIG. 5C.

FIG. 5A is an explanatory diagram illustrating the state of a user operation in a state in which a part of the layout screen of FIG. 3 is enlarged. FIG. 5B is an explanatory diagram illustrating path information input through the layout screen of FIG. 5A. FIG. 5C is an explanatory diagram illustrating section data extracted from the path information of FIG. 5B. FIG. 5D is an explanatory diagram illustrating wind information created based on the section data of FIG. 5C. FIGS. 5A to 5D will be referenced to describe the wind direction control by the controller 110 according to an input operation by the user. Note that the user is able to enlarge a part of the layout screen in FIG. 3 by performing a pinch-out on the layout screen L or an operation specifying and cutting out a part of the layout screen L.

The controller 110 is configured to control the wind direction of two or more air outlets based on the information indicating the reach position of wind received by the input unit 130, the arrangement information indicating the arrangement of each of the indoor units 300, and the function information indicating the function of each of the air conditioners.

Herein, in FIG. 5A, two icons S indicating two stopped indoor units 300 are illustrated. Additionally, the example of FIG. 5A illustrates an exemplary case of the user tracing a path with a finger on the layout screen L, or in other words sliding the finger from the position of Fs to the position of Fe on the layout screen L. Thus, as the information indicating the reach position of wind specified at the input unit 130, the controller 110 receives the input of path information 131 that is information indicating a continuous path including a start point Ps and an end point Pe as illustrated in FIG. 5B. The path information 131 is information indicating the path from the start position to the end position of the slide operation by the user.

In Embodiment 1, the controller 110 is configured to cause the display unit 140 to track the motion of the user's finger on the layout screen L and display the information indicating the path with a straight or curved line. In other words, the controller 110 recognizes the position where the user starts the slide as the start point Ps, and also displays information indicating the path until the user releases his or her finger on the display unit 140, and recognizes the position where the user ends the slide, or in other words the position where the user releases his or her finger, as the end point Pe.

Next, as illustrated in FIG. 5C, the controller 110 is configured to extract data indicating a path overlapping the range indicated by the range information Wr from among the path information 131 as section data 132. In other words, from among the path information 131, the controller 110 extracts data within the maximum range of the wind blown out from each of the air outlets as the section data 132.

Subsequently, the controller 110 controls the wind direction of two or more air outlets based on the extracted section data 132. More specifically, based on the extracted section data 132, the controller 110 sets the wind direction of air outlets associated with the range information Wr including the section data 132, and adjusts the wind direction of each air outlet based on the set content. Also, based on the section data 132, the controller 110 sets the control content of two or more air outlets, and displays the wind information Wj indicating the set control content on the display unit 140. In Embodiment 1, as illustrated in FIG. 5D, the controller 110 is configured to set the wind information Wj with reference to the farthest distance of the section data 132. Herein, the farthest distance of the section data 132 refers to the distance at the position farthest away from the icons S in the section data 132.

Figure 6:
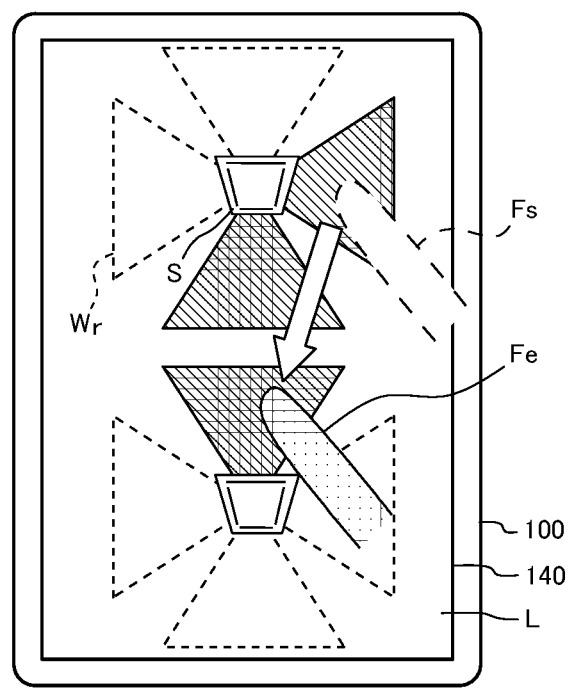
FIG. 6 is another explanatory diagram illustrating the state of a user operation in a state in which a part of the layout screen of FIG. 3 is enlarged.

FIG. 6 is another explanatory diagram illustrating the state of a user operation in a state in which a part of the layout screen of FIG. 3 is enlarged. In FIG. 6, two icons S indicating two running indoor units 300 are illustrated. As in FIG. 6, even in the case in which the indoor units 300 are running, or in other words, even in the case in which air is being sent out from air outlets, if the user traces a path with his or her finger on the layout screen L, the controller 110 controls each air outlet to achieve the wind direction state illustrated in FIG. 5D. In other words, the controller 110 receives the input of the path information 131 like in FIG. 5B, extracts the section data 132 from the path information 131 as illustrated in FIG. 5C, and adjusts the wind direction of each air outlet and also displays the wind information Wj as illustrated in FIG. 5D on the display unit 140.

Herein, FIG. 5B illustrates an example of a case in which the controller 110 causes the display unit 140 to display the path information 131, but the configuration is not limited thereto, and the controller 110 may also not cause the path information 131 to be displayed. However, since causing the display unit 140 to display the path information 131 enables the user to confirm the path of one's own finger, convenience is improved. Also, FIG. 5C illustrates an example of a case in which the controller 110 causes the display unit 140 to display the section data 132 extracted from the path information 131, but the configuration is not limited thereto, and the controller 110 may also not execute the process of causing the section data 132 to be displayed.

Figure 7A:
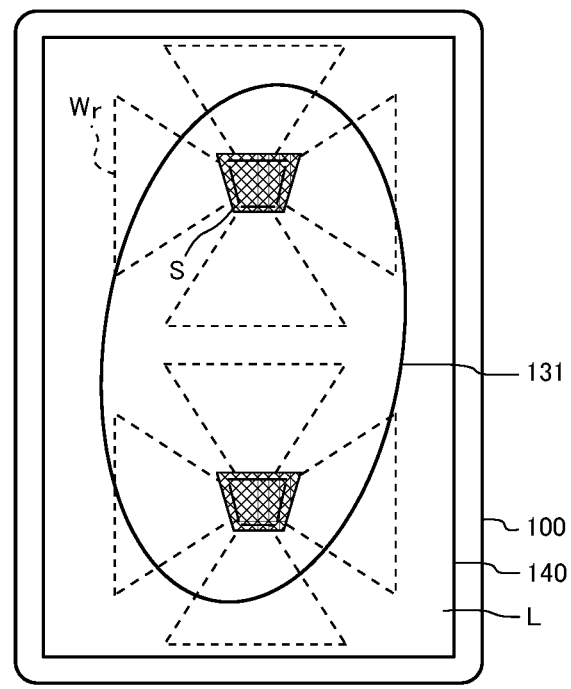
FIG. 7A is an explanatory diagram illustrating an exemplary case in which a user inputs ring-shaped path information including two icons in a state in which a part of the layout screen of FIG. 3 is enlarged.
Figure 7B:
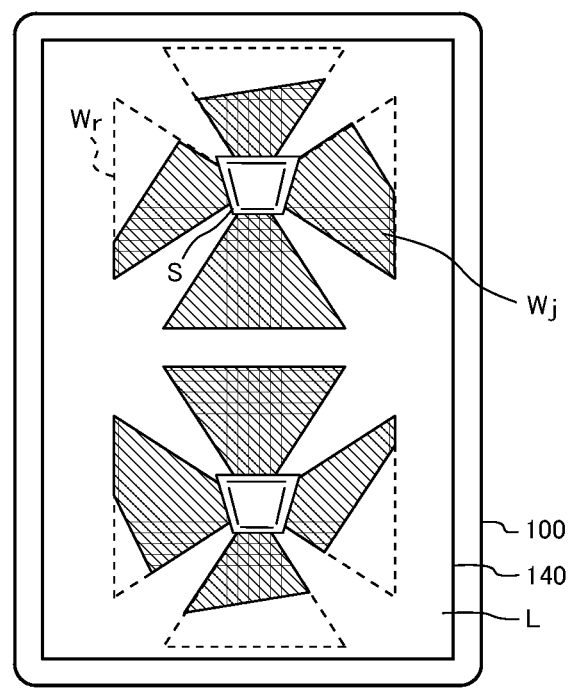
FIG. 7B is an explanatory diagram illustrating wind information created based on the path information illustrated in FIG. 7A.

FIG. 7A is an explanatory diagram illustrating an exemplary case in which a user inputs ring-shaped path information including two icons in a state in which a part of the layout screen of FIG. 3 is enlarged. FIG. 7B is an explanatory diagram illustrating wind information created based on the path information illustrated in FIG. 7A.

In the case in which the user specifies ring-shaped path information 131 in which the start point and the end point are the same as the information indicating the reach position of the wind, the controller 110 is configured to control the wind direction of two or more air outlets inside the ring-shaped path information 131. As illustrated in FIG. 7A, in the case in which the user specifies ring-shaped path information 131 including two icons S on the inside, the controller 110 is configured to extract the portion overlapping the range indicated by the range information Wr in the internal region of the ring-shaped path information 131 as the control region. Subsequently, based on the extracted control region, the controller 110 adjusts the wind direction of each air outlet, and displays the wind information Wj as illustrated in FIG. 7B on the display unit 140. Even when the user specifies ring-shaped path information 131 including two or more icons S on the inside, the controller 110 executes wind direction control similar to the above.

Figure 8A:
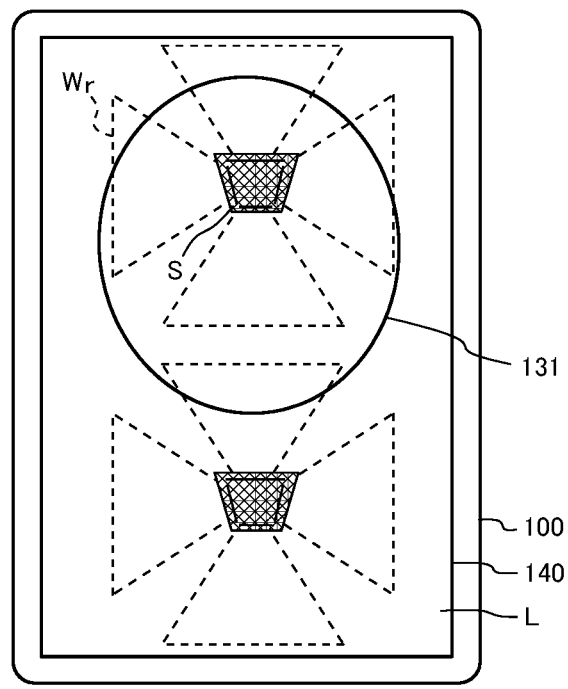
FIG. 8A is an explanatory diagram illustrating an exemplary case in which a user inputs ring-shaped path information including one icon in a state in which a part of the layout screen of FIG. 3 is enlarged.
Figure 8B:
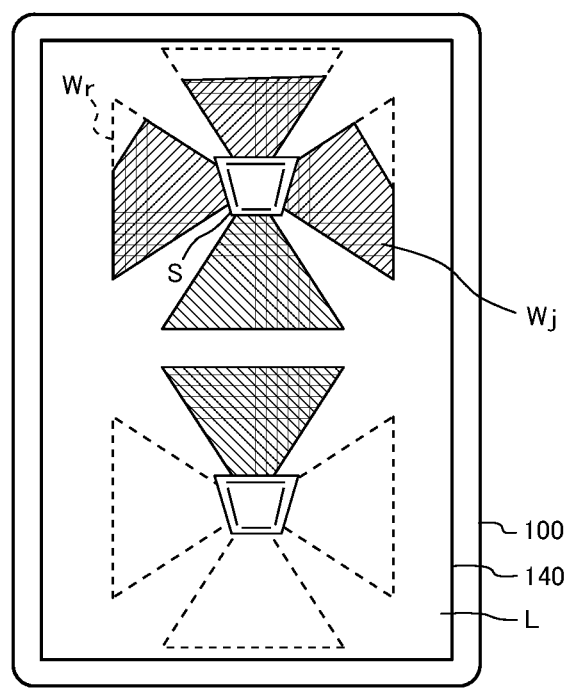
FIG. 8B is an explanatory diagram illustrating wind information created based on the path information illustrated in FIG. 8A.

FIG. 8A is an explanatory diagram illustrating an exemplary case in which a user inputs ring-shaped path information including one icon in a state in which a part of the layout screen of FIG. 3 is enlarged. FIG. 8B is an explanatory diagram illustrating wind information created based on the path information illustrated in FIG. 8A.

As illustrated in FIG. 8A, in the case in which the user specifies ring-shaped path information 131 including one icon S on the inside, the controller 110 is configured to extract the portion overlapping the range indicated by the range information Wr in the internal region of the ring-shaped path information 131 as the control region.

Subsequently, based on the extracted control region, the controller 110 adjusts the wind direction of each air outlet, and displays the wind information Wj as illustrated in FIG. 8B on the display unit 140. If part of the range information Wr overlapping the region on the inside of the path information 131 corresponds to an icon S not included on the inside of the path information 131, the controller 110 executes wind direction control to blow out wind toward the control region extracted from the range information Wr.

Figure 9A:
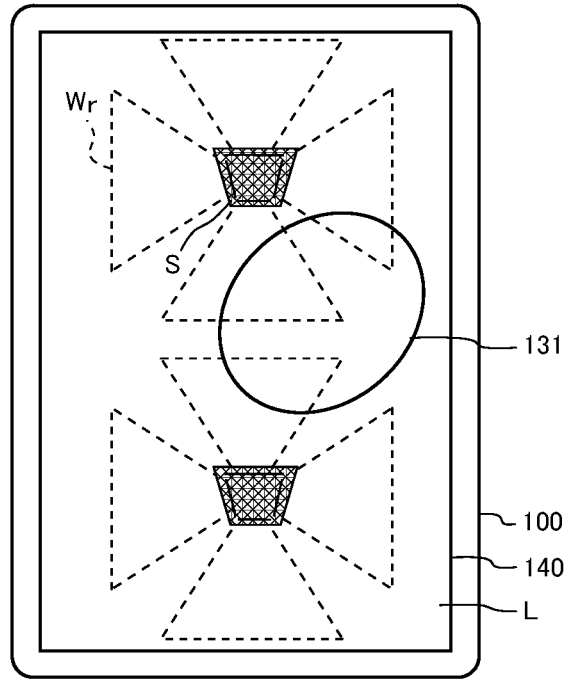
FIG. 9A is an explanatory diagram illustrating an exemplary case in which a user inputs ring-shaped path information that does not include any icons in a state in which a part of the layout screen of FIG. 3 is enlarged.
Figure 9B:
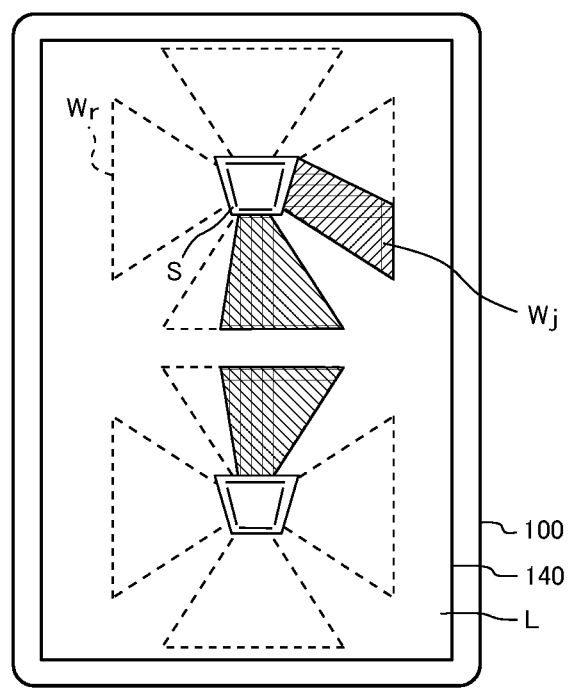
FIG. 9B is an explanatory diagram illustrating wind information created based on the path information illustrated in FIG. 9A.

FIG. 9A is an explanatory diagram illustrating an exemplary case in which a user inputs ring-shaped path information that does not include any icons in a state in which a part of the layout screen of FIG. 3 is enlarged. FIG. 9B is an explanatory diagram illustrating wind information created based on the path information illustrated in FIG. 9A.

As illustrated in FIG. 9A, in the case in which the user specifies ring-shaped path information 131 that does not include any icons S on the inside, the controller 110 is configured to extract the portion overlapping the range indicated by the range information Wr in the internal region of the ring-shaped path information 131 as the control region. Herein, the ring shape is assumed to include not only circular or elliptical shapes, but also polygonal shapes. Subsequently, based on the extracted control region, the controller 110 adjusts the wind direction of each air outlet, and displays the wind information Wj as illustrated in FIG. 9B on the display unit 140. In other words, the controller 110 executes wind direction control of each air outlet to blow out wind toward the extracted control region.

FIGS. 7A, 7B, 8A, 8B, 9A, and 9B illustrate an example of a case in which, when the user specifies ring-shaped path information 131, the controller 110 executes wind direction control targeting the inside of the path information 131, but the configuration is not limited thereto. In other words, even if the user specifies ring-shaped path information 131, the controller 110 may also extract the section data 132 from the path information 131 and execute wind direction control based on the extracted section data 132.

As above, by receiving an operation specifying a reach position of wind blown out from two or more air outlets in association with the layout screen L, the central management device 100 is able to control the wind blown out from multiple air outlets with a single operation. For this reason, it is possible to achieve collective wind direction control and wind control with respect to multiple air outlets. Also, the controller 110 displays, on the display unit 140, wind information Wj indicating the control content set based on the information indicating the reach position, the arrangement information, and the function information 170 in association with the arrangement information. Thus, since it is possible to understand the current control content or the adjusted control content at a glance, an improvement in user convenience may be attained.

Furthermore, since the controller 110 reflects the information Wr indicating the range of reach of wind on the layout screen L displayed on the display unit 140, the user is able to understand the region in which the information indicating the reach position should be input at a glance, and thus an improvement in ease-of-use may be attained. Also, the controller 110 controls at least one of the wind direction and the wind volume of two or more air outlets according to the positional relationship between the range information Wr and the information indicating the reach position. For this reason, the content of the input operation may be reflected accurately in the control of the wind. In addition, since the controller 110 displays the information Wr indicating the range of reach of wind on the display unit 140 as a trapezoidal region, intuitive operations by the user become possible.

Also, the central management device 100 receives the input of information indicating the continuous path including a start point and an end point as information indicating the reach position of wind blown out from two or more air outlets. In other words, the controller 110 acquires the path information 131 indicating the path drawn across multiple pieces of range information Wr through the input unit 130, and executes wind direction control based on the acquired path information 131. Therefore, since the user is able to specify multiple pieces of range information Wr collectively with a single operation, convenience is raised for the user, and an improvement in ease-of-use may be attained.

Furthermore, since the controller 110 executes wind direction control based on the section data 132 extracted from the path information 131, it is possible to perform accurate wind direction adjustment according to the positional relationship between the range information Wr and the section data 132. Additionally, in the case in which the path information 131 is ring-shaped information in which the start point Ps and the end point Pe are the same, the controller 110 executes wind direction control targeting the inside of the ring shape. Thus, since the user is able to select the desired region in which to perform wind direction adjustment with a simple operation, it is possible to raise convenience and ease-of-use. In addition, since the input unit 130 and the display unit 140 are stacked on top of each other to form a touch panel, by tracing a desired range in which to perform wind direction control on the layout screen L, it is possible to perform an operation adjusting multiple wind directions of multiple air conditioners collectively.

<Modification 1-1>

Figure 10:
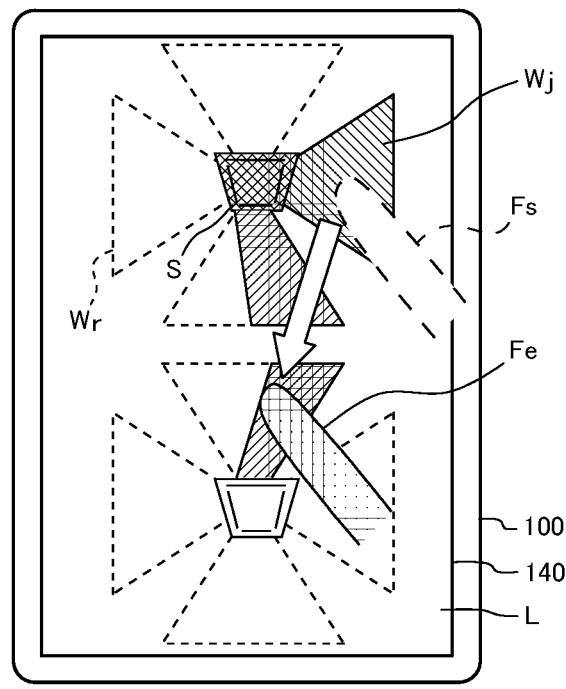
FIG. 10 is an explanatory diagram illustrating another example of an input operation on a layout screen of the air conditioning system according to Modification 1-1 of Embodiment 1 of the present invention.

FIG. 10 is an explanatory diagram illustrating another example of an input operation on a layout screen of the air conditioning system according to Modification 1-1 of Embodiment 1 of the present invention. The controller 110 described above is configured to cause air to be sent from the air outlets associated with all of the ranges indicated by range information Wr overlapping the path indicated by the path information 131, regardless of the air-sending state of the air outlet associated with the range information Wr where the start point Ps of the path information 131 is positioned.

In contrast, in the case in which air is being sent from the air outlet associated with the range information Wr where the start point Ps of the path information 131 is positioned, the controller 110 is configured to put the air-sending state of the air outlets associated with all ranges indicated by pieces of range information Wr overlapping the path indicated by the path information 131 into a stopped state. In other words, like in FIG. 10, in the case in which wind information Wj is being displayed inside the range information Wr where the start point of the path information 131 is positioned, the controller 110 removes the wind information Wj inside all ranges indicated by pieces of range information Wr overlapping the path indicated by the path information 131 according to a slide operation by the user. With this arrangement, the display state in FIG. 10 is changed to the display state of FIG. 5A in which the wind information Wj is removed.

On the other hand, in the case in which air-sending from the air outlet associated with the range information Wr where the start point of the path information 131 is positioned is stopped, the controller 110 is configured to put the air-sending state of the air outlets associated with all ranges indicated by pieces of range information Wr overlapping the path indicated by the path information 131 into a running state. In other words, if air-sending from the air outlet associated with the range information Wr where the start point of the path information 131 is positioned is stopped, the controller 110 of Modification 1-1 also executes wind direction control according to the path information 131.

As above, if a slide operation is started from the range information Wr associated with a certain air outlet in a running state, the central management device 100 of Modification 1-1 is able to put all air outlets associated with the slide operation in a stopped state. In other words, by recognizing the presence or absence of wind information Wj inside the range information Wr and choosing the range information Wr at which to start the slide operation, the user is able to switch the air-sending state of air outlets easily and rapidly.

Embodiment 2

The configuration of the air conditioning system according to Embodiment 2 is similar to Embodiment 1 described above. For component members that are similar to Embodiment 1, the same signs will be used and the description will be omitted. On a floor partitioned into zones such as rooms or spaces, the central management device 100 in Embodiment 2 is able to control the wind direction of air conditioners in units of zones.

Figure 11:
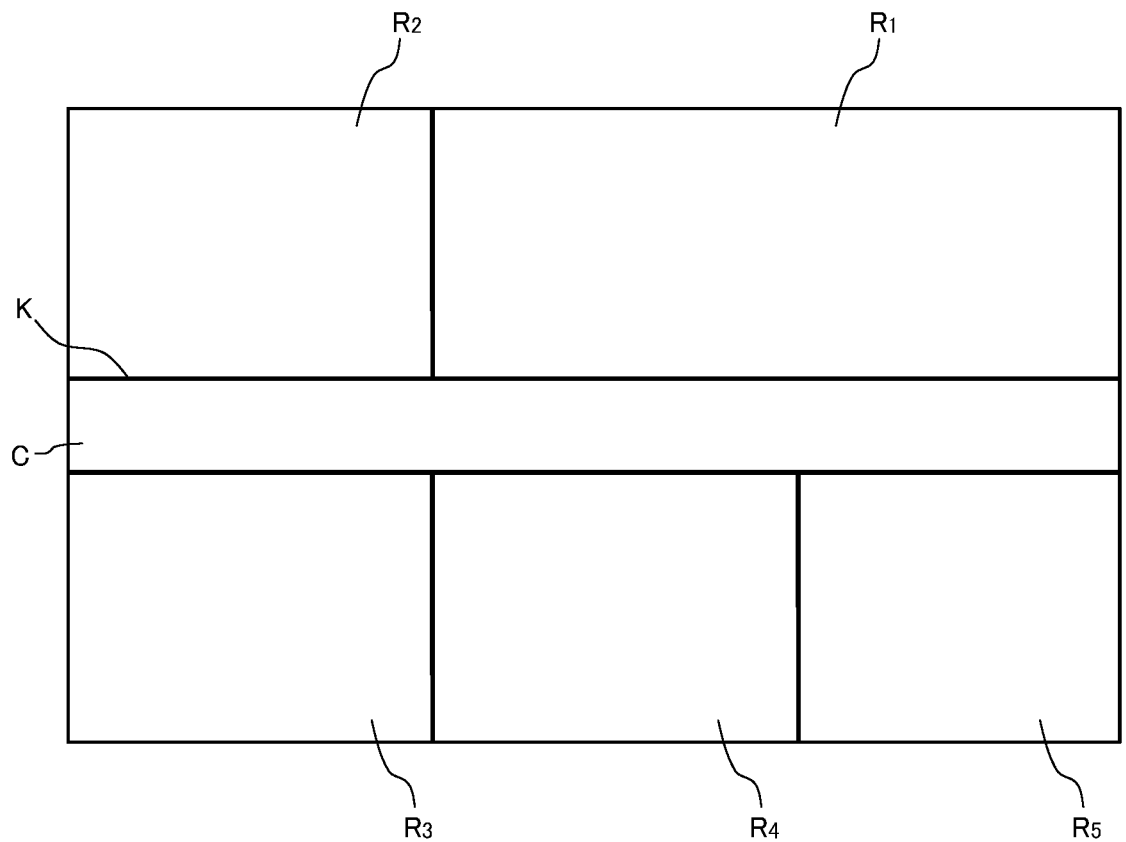
FIG. 11 is an explanatory diagram illustrating an example of zone information stored by a storage unit of the central management device according to Embodiment 2 of the present invention.

FIG. 11 is an explanatory diagram illustrating an example of zone information stored by the storage unit of the central management device according to Embodiment 2 of the present invention. In FIG. 11, partitions between zones are illustrated, and each zone corresponds to each room in FIGS. 12A to 12C described later. Each zone of the zone information may be specified by an image file or specified by coordinates.

In Embodiment 2, the storage unit 150 stores the zone information partitioning each of the rooms into zones. The zone information is associated with arrangement information indicating the arrangement of each air conditioner. Based on the zone information, the controller 110 determines whether or not the path information 131 indicates the path drawn across two or more rooms. In the case of determining that the path information 131 spreads over two or more rooms, the controller 110 extracts the section data 132 after removing all portions not inside the room that includes the start point Ps from the path information 131. In other words, the controller 110 picks out the portion inside the room that includes the start point Ps from the path information 131, and extracts the section data 132 from the picked-out portion of the path information 131.

Figure 12A:
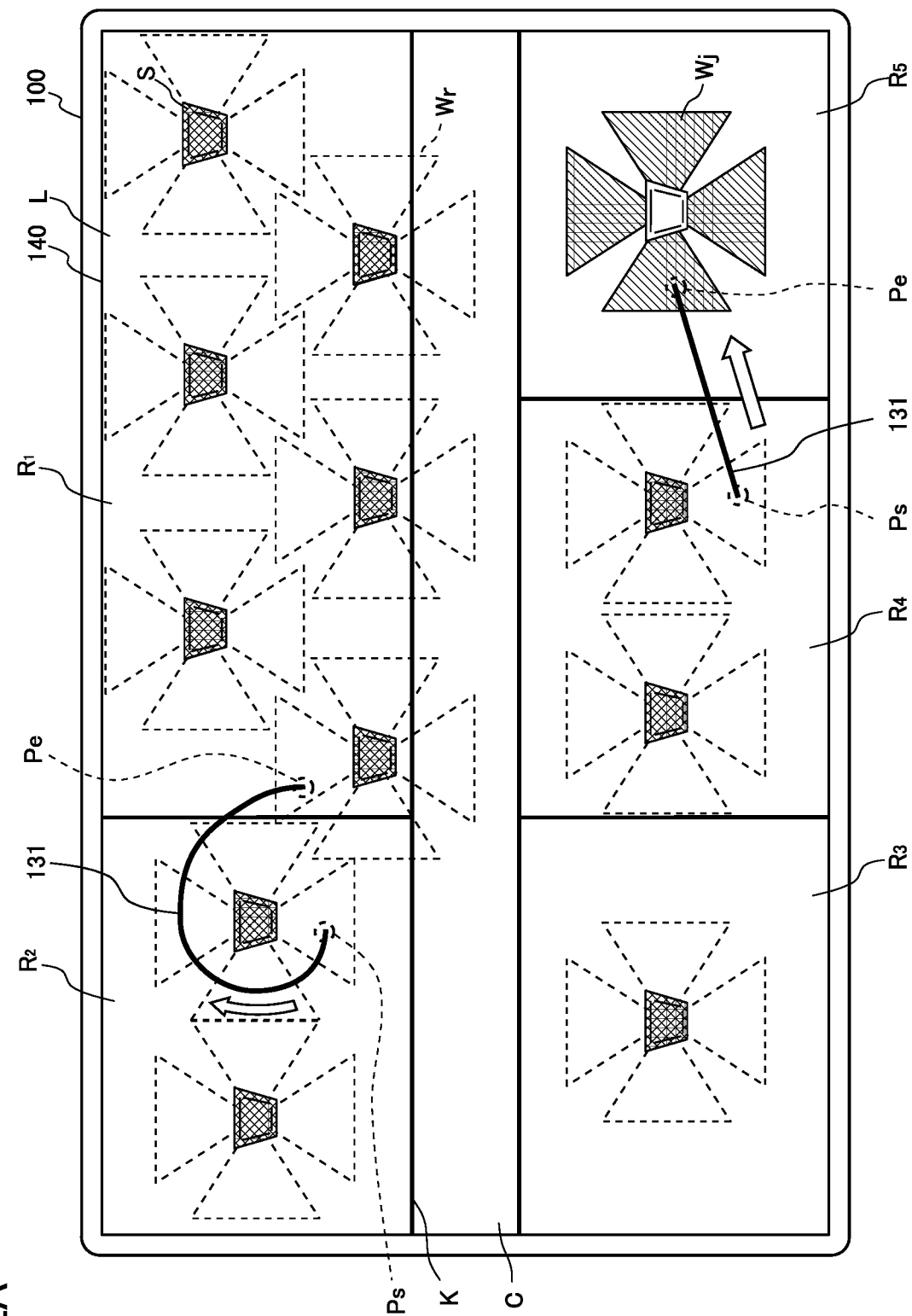
FIG. 12A is an explanatory diagram illustrating an exemplary layout screen displayed on a display unit of the central management device according to Embodiment 2 of the present invention.
Figure 12B:
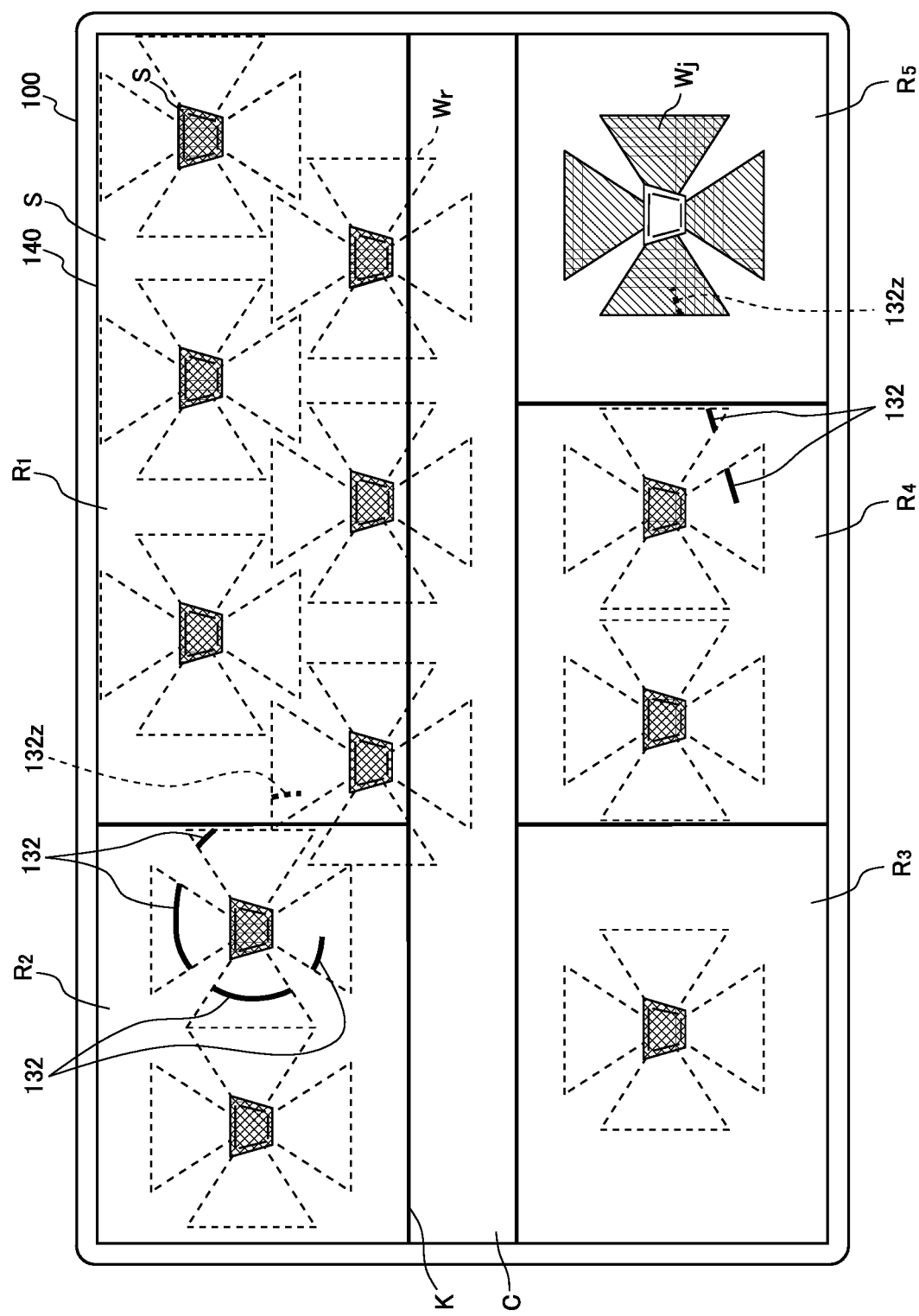
FIG. 12B is an explanatory diagram illustrating section data extracted from the path information of FIG. 12A.
Figure 12C:
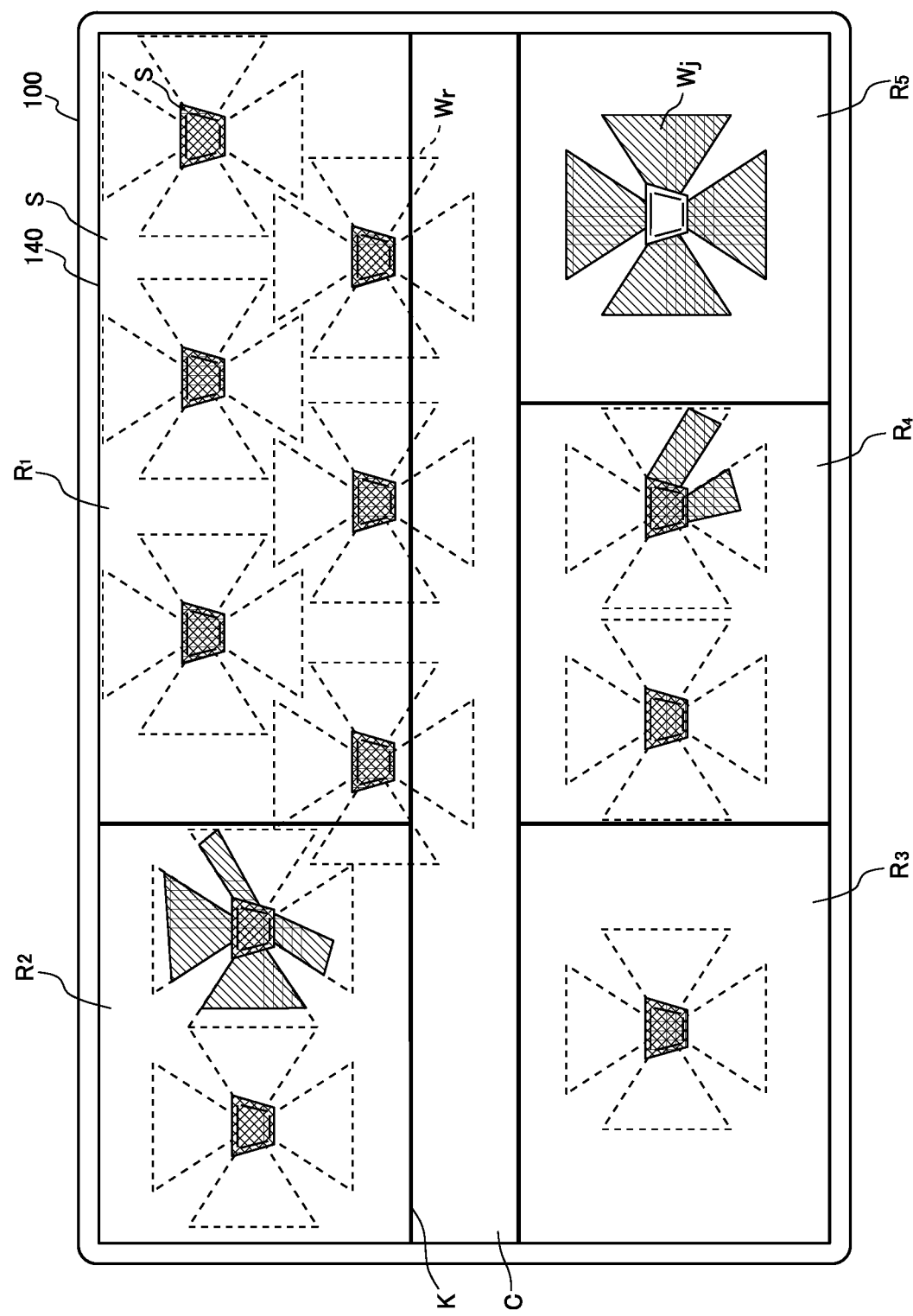
FIG. 12C is an explanatory diagram illustrating wind information created based on the section data of FIG. 12B.

FIG. 12A is an explanatory diagram illustrating an exemplary layout screen displayed on the display unit of the central management device according to Embodiment 2 of the present invention. FIG. 12B is an explanatory diagram illustrating section data extracted from the path information of FIG. 12A. FIG. 12C is an explanatory diagram illustrating wind information created based on the section data of FIG.

12B. On the layout screen L of FIGS. 12A to 12C, rooms $R_1$ to $R_5$, a corridor C, and partitions K between rooms or between each room and the corridor C are displayed as the layout diagram. FIGS. 12A to 12C illustrate an example of a situation in which one or multiple indoor units 300 are provided in each of multiple rooms on a single floor.

Suppose that when the user performs a slide operation on the layout screen L like the solid-white arrow illustrated in the room $R_2$ of FIG. 12A, the path of the slide operation is drawn across the room $R_2$ and the room $R_1$. Additionally, suppose that path information 131 extending from the start point Ps in the room $R_2$ to the end point Pe in the room $R_1$ as illustrated in FIG. 12A is input into the controller 110 from the input unit 130. In this case, the controller 110 determines that the path information 131 indicating the path is drawn across two rooms. Thus, the controller 110 removes all portions not inside the room that includes the start point Ps from the path information 131. In the case of FIG. 12A, the controller 110 removes the portion of the path information 131 in the room $R_1$, and takes the portion in the room $R_2$ from the path information 131.

Next, as illustrated in FIG. 12B, the controller 110 extracts data indicating a path overlapping the range indicated by the range information Wr from the path information 131 in the room $R_1$ as the section data 132. In other words, with regard to excluded data 132z indicating a path overlapping the range indicated by the range information Wr in the room $R_2$ among the path information 131, the controller 110 does not extract such data as the section data 132. Subsequently, based on the extracted section data 132, the controller 110 sets the wind direction of air outlets associated with the range information Wr including the section data 132, adjusts the wind direction of each air outlet based on the set content, and also displays, on the display unit 140 wind information Wj indicating the set content as illustrated in FIG. 12C.

Also, suppose that the user performs a slide operation on the layout screen L like the solid-white arrow stretching from the room $R_4$ to the room $R_5$ in FIG. 12A, and the path of the slide operation is drawn across the room $R_4$ and the room $R_5$. Additionally, suppose that path information 131 extending from the start point Ps in the room $R_4$ to the end point Pe in the room $R_5$ as illustrated in FIG. 12A is input into the controller 110 from the input unit 130. In this case, since the path information 131 indicating the path is drawn across two rooms, the controller 110 removes the portion of the path information 131 in the room $R_5$, and takes the portion in the room $R_4$ from the path information 131. Next, as illustrated in FIG. 12B, the controller 110 extracts data indicating a path overlapping the range indicated by the range information Wr from the path information 131 in the room $R_4$ as the section data 132.

Based on the extracted section data 132, the controller 110 sets the wind direction of air outlets associated with the range information Wr including the section data 132. Additionally, the controller 110 adjusts the wind direction of each air outlet based on the set content, and also displays, on the display unit 140, wind information Wj indicating the set content as illustrated in FIG. 12C.

As above when the user inputs a desired range to operate through the input unit 130 as the path information 131, and the path information 131 indicating the path is drawn across a zone and reaches into a different zone, the controller 110 removes the data in the different zone from the path information 131. Thus, since only the information indicating the path in the zone of the position where the input operation was started initially remains as the path information 131, wind direction control with respect to only the air conditioners inside the zone may be achieved.

In other words, in Embodiment 2, the controller 110 is configured to pick and choose the path information 131 using the zone information. For this reason, when performing an operation at a position such as a corner of a room or at the edge of a division, even if the user accidentally traces over the range information Wr of air conditioners in another zone, the air conditioners in the other zone are not affected. Thus, since mistaken operation may be prevented and the user is able to perform operations with assurance, an improvement in ease-of-use may be attained. In other words, according to the central management device 100 of Embodiment 2, since the user is able to perform operations with an awareness of the inside and outside of zones, simple and more fine-grained operations on each zone may be achieved.

By the way, although the above description illustrates an example of a case of removing path information when spreading over a zone, the controller 110 may also be configured not to remove the path information if the path information spreads over a specific combination of zones. Also, when the path indicated by the path information 131 being drawn across a zone, the central management device 100 may also be configured to enable the user to selectively set whether or not to remove the portion outside the zone including the start point Ps from the path information 131.

In addition, the zone information may also be information indicating partitions of each room. Furthermore, the controller 110 may be configured to determine whether or not the path information 131 intersects the partition information. Subsequently, in the case of determining that the path information 131 intersects the partition information, the controller 110 may be configured to extract the section data 132 after removing all portions not inside the room that includes the start point Ps from the path information 131.

Also, FIG. 12A illustrates an example of a case in which the controller 110 displays, on the display unit 140, the path information 131, but the configuration is not limited thereto, and the controller 110 may also not cause the path information 131 to be displayed. Also, FIG. 12B illustrates an example of a case in which the controller 110 causes the display unit 140 to display the section data 132 extracted from the path information 131, but the configuration is not limited thereto, and the controller 110 may also not execute the process of causing the section data 132 to be displayed. Note that the excluded data 132z is illustrated for the sake of explanation, and is not displayed on the display unit 140.

<Modification 2-1>

Figure 13:
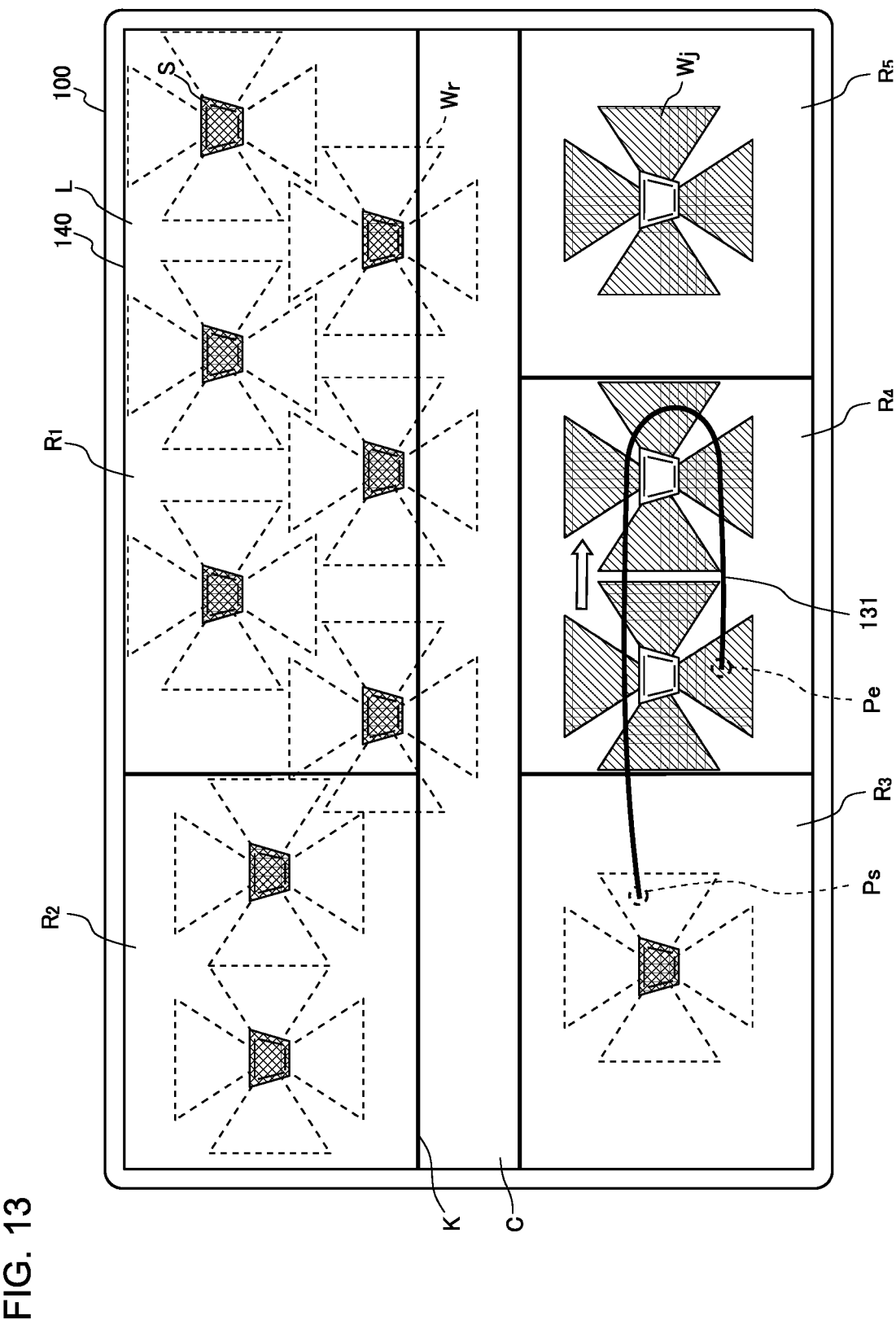
FIG. 13 is an explanatory diagram illustrating an example of an input operation on a layout screen of the air conditioning system according to Modification 2-1 of Embodiment 2 of the present invention.

FIG. 13 is an explanatory diagram illustrating an example of an input operation on a layout screen of the air conditioning system according to Modification 2-1 of Embodiment 2 of the present invention. In the case in which the path information 131 is drawn across two or more rooms, the controller 110 of Modification 2-1 causes the air-sending state of the air outlet associated with the range information Wr where the start point of the path information 131 is positioned to be reflected in the air-sending state of the air outlets associated with each piece of other range information Wr overlapping the path indicated by the path information 131.

For example, in the case in which the path information 131 indicating the path is drawn across the room $R_3$ and the room $R_4$ like the example in FIG. 13, if air-sending is stopped from the air outlet associated with the range information Wr where the start point Ps is positioned, the air-sending states of the air outlets associated with each piece of the range information Wr in the room $R_4$ are put into the stopped state. In other words, when wind information Wj is not being displayed in the range information Wr where the start point Ps is positioned, the user performs a slide operation like the solid-white arrow, thereby causing the controller 110 to remove the wind information Wj in the room $R_4$ and set a state like in FIG. 12A. As above, since the air-sending state of an air conditioner in a certain zone may be reflected in the air-sending state of air conditioners in another zone, an improvement in ease-of-use may be attained particularly in the case of wanting to put the air-sending state of the air outlets into the stopped state.

Embodiment 3

Since the configuration of the air conditioning system according to Embodiment 3 is similar to Embodiments 1 and 2, for component members that are similar to Embodiments 1 and 2, the same signs will be used and the description will be omitted. In the case in which a press-and-hold operation is performed on the start point Ps of the path information 131 to the input unit 130, the controller 110 according to Embodiment 3 is configured to control the wind direction of the air outlet associated with the location of the start point Ps. Note that likewise in Embodiment 3, since the input unit 130 and the display unit 140 form a touch panel, a press-and-hold operation corresponds to a long tap. Hereinafter, a specific description will be given with reference to the drawings.

Figure 14A:
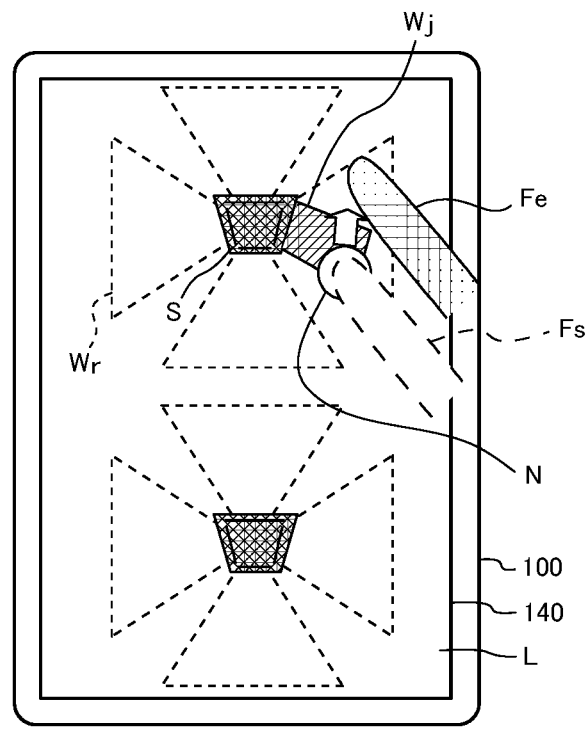
FIG. 14A is an explanatory diagram illustrating an operation accompanying a long-press by a user on the layout screen of the central management device according to Embodiment 3 of the present invention.
Figure 14B:
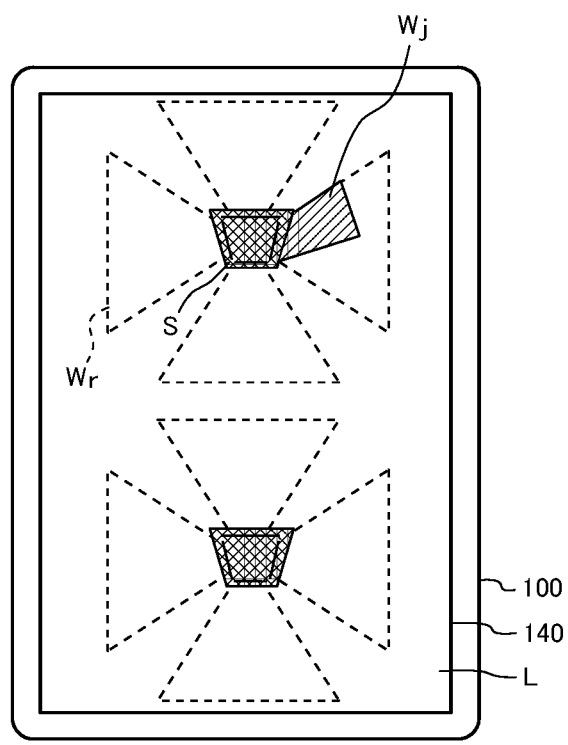
FIG. 14B is an explanatory diagram illustrating a change of wind information by the operation of FIG. 14A.

FIG. 14A is an explanatory diagram illustrating an operation accompanying a long-press by a user on the layout screen of the central management device according to Embodiment 3 of the present invention. FIG. 14B is an explanatory diagram illustrating a change of wind information by the operation of FIG. 14A. In FIG. 14A, the press-and-hold operation by the user is illustrated as a solid-white circle labeled with the sign "N" for the sake of convenience. The same also applies to FIGS. 16A and 17A.

As illustrated in FIG. 14A, in the case in which the user performs a press-and-hold operation on the wind information Wj and then performs a slide operation to the left or right, the controller 110 moves the wind direction of the air outlet in the direction of the slide operation. In other words, according to an input operation by the user, the controller 110 adjusts the angle of the horizontal louver 350 and also changes the wind information Wj like in FIG. 14B.

Figure 15A:
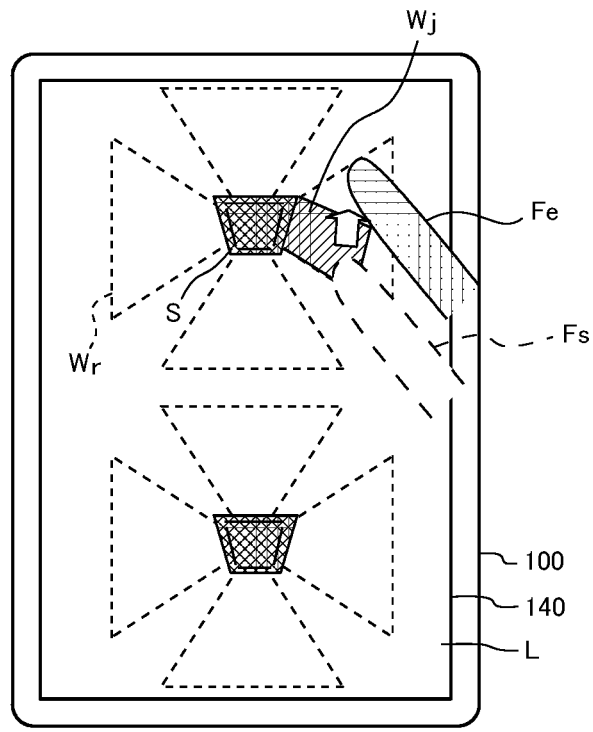
FIG. 15A is an explanatory diagram illustrating a user operation on the layout screen of the central management device according to Embodiment 3 of the present invention.
Figure 15B:
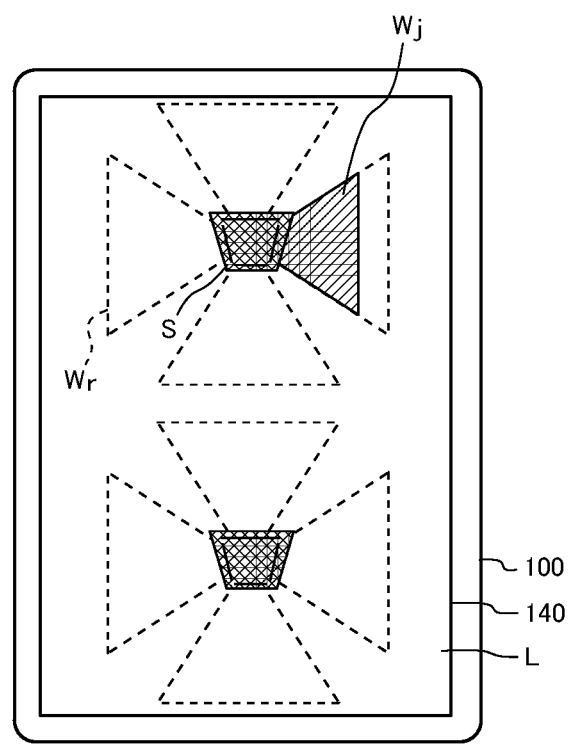
FIG. 15B is an explanatory diagram illustrating a change of wind information by the operation of FIG. 15A.

FIG. 15A is an explanatory diagram illustrating a user operation on the layout screen of the central management device according to Embodiment 3 of the present invention. FIG. 15B is an explanatory diagram illustrating a change of wind information by the operation of FIG. 15A. In FIGS. 15A and 15B, to contrast the change in the wind information Wj with that of FIGS. 14A and 14B, the finger path in FIG. 15A is the same as the finger path in FIG. 14A. As illustrated in FIG. 15A, in the case in which the user performs a slide operation to the left or right without performing a press-and-hold operation on the wind information Wj, the controller 110 adjusts the angle of the horizontal louver 350 based on the path information 131 of the slide operation, and changes the wind information Wj like in FIG. 15B. In other words, in the case in which the user performs a slide operation not accompanied by a press-and-hold operation, the collective wind direction control with respect to multiple air outlets described with reference to FIGS. 5A to 5D in Embodiment 1 is executed.

Figure 16A:
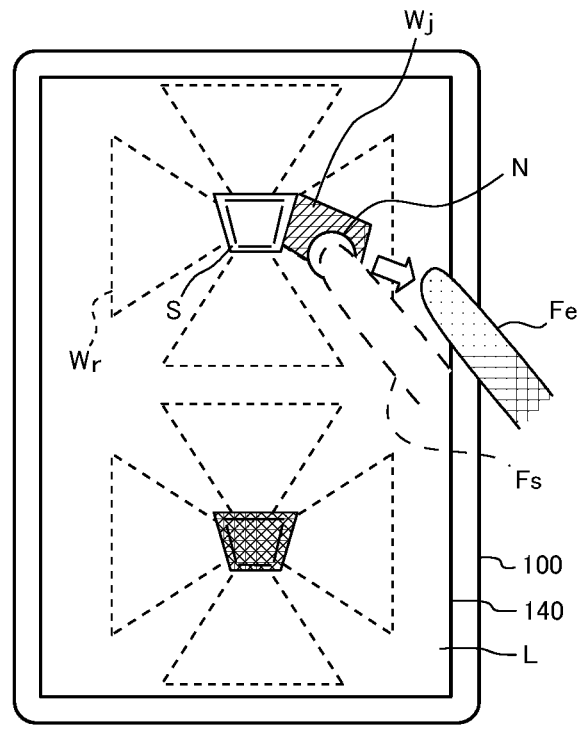
FIG. 16A is an explanatory diagram illustrating another operation accompanying a long-press by a user on the layout screen of the central management device according to Embodiment 3 of the present invention.
Figure 16B:
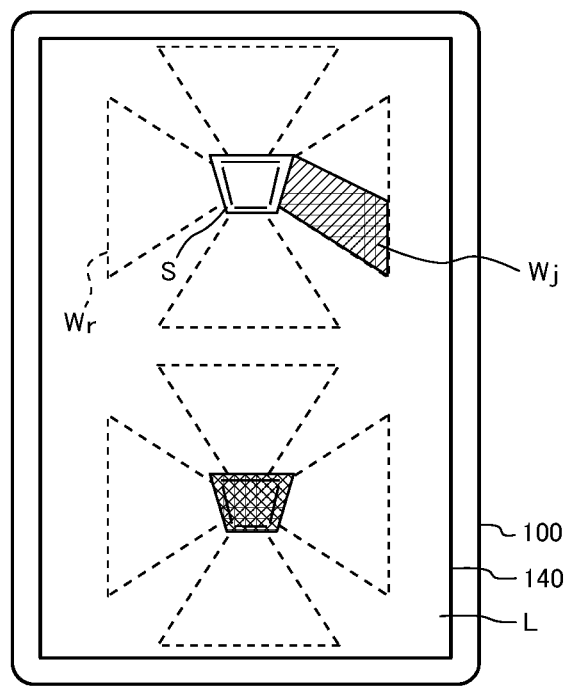
FIG. 16B is an explanatory diagram illustrating a change of wind information by the operation of FIG. 16A.

FIG. 16A is an explanatory diagram illustrating another operation accompanying a long-press by the user on the layout screen of the central management device according to Embodiment 3 of the present invention. FIG. 16B is an explanatory diagram illustrating a change of wind information by the operation of FIG. 16A. As illustrated in FIG. 16A, in the case in which the user performs a press-and-hold operation on the wind information Wj and then performs a slide operation in the direction in which the wind information Wj proceeds from the icon S toward the outside, the controller 110 moves the wind direction of the air outlet in the direction of the slide operation. At this point, assume that the direction in which the wind direction Wj proceeds from the icon S toward the outside is the outward direction. In other words, according to an input operation by the user, the controller 110 adjusts the angle of the vertical flap 340 and also changes the wind information Wj like in FIG. 16B.

Figure 17A:
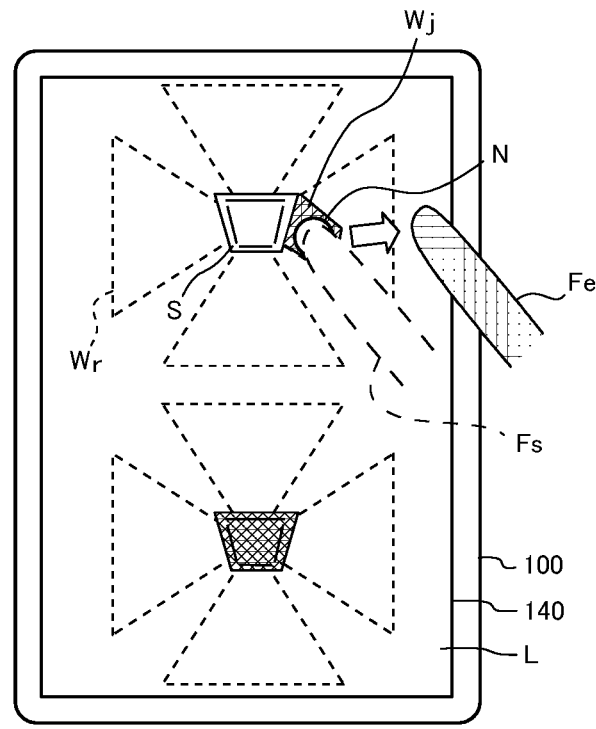
FIG. 17A is an explanatory diagram illustrating a different operation accompanying a long-press by a user on the layout screen of the central management device according to Embodiment 3 of the present invention.
Figure 17B:
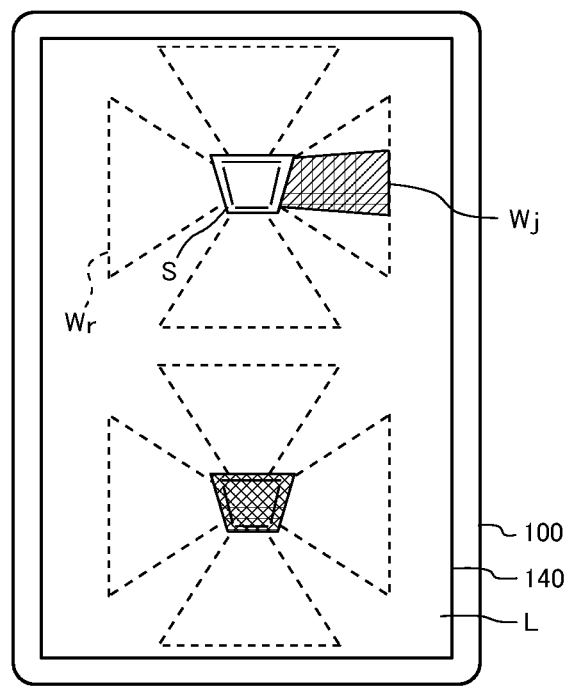
FIG. 17B is an explanatory diagram illustrating a change of wind information by the operation of FIG. 17A.

FIG. 17A is an explanatory diagram illustrating a different operation accompanying a long-press by the user on the layout screen of the central management device according to Embodiment 3 of the present invention. FIG. 17B is an explanatory diagram illustrating a change of wind information by the operation of FIG. 17A. As illustrated in FIG. 17A, in the case in which the user performs a press-and-hold operation on the wind information Wj and then performs a slide operation that moves in the outward direction while also moving to the left or right, the controller 110 moves the wind direction of the air outlet to the left or right and in the outward direction. In other words, according to an input operation by the user, the controller 110 adjusts the angles of the vertical flap 340 and the horizontal louver 350 and also changes the wind information Wj like in FIG. 17B.

Figure 18A:
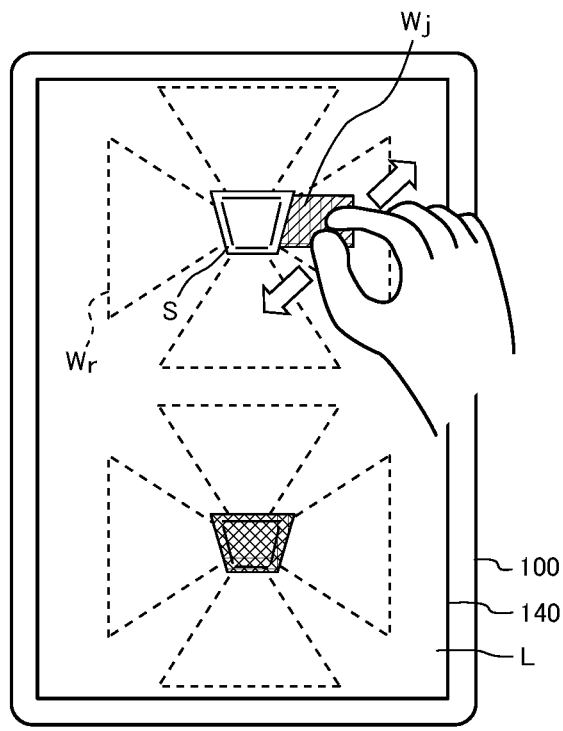
FIG. 18A is an explanatory diagram illustrating yet another operation accompanying a long-press by a user on the layout screen of the central management device according to Embodiment 3 of the present invention.
Figure 18B:
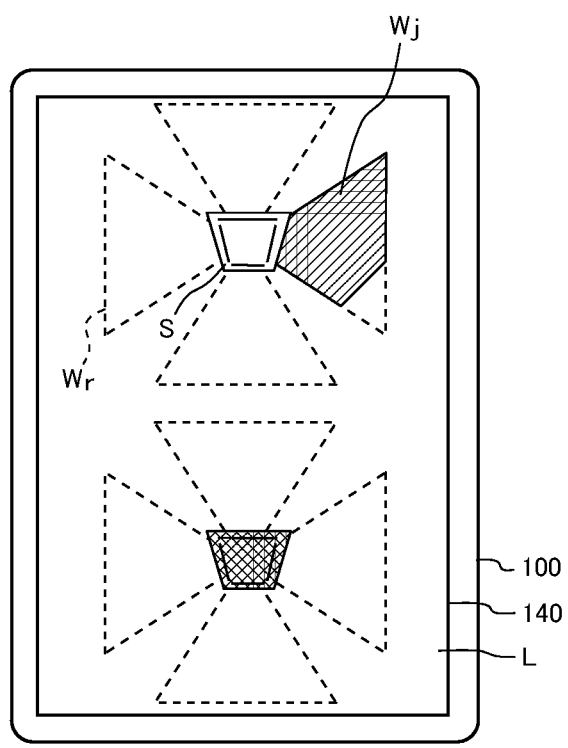
FIG. 18B is an explanatory diagram illustrating a change of wind information by the operation of FIG. 18A.

FIG. 18A is an explanatory diagram illustrating yet another operation accompanying a long-press by the user on the layout screen of the central management device according to Embodiment 3 of the present invention. FIG. 18B is an explanatory diagram illustrating a change of wind information by the operation of FIG. 18A. FIG. 18A illustrates an example of a case in which the user performs an operation of placing two fingers on the wind information Wj and spreading the fingers out, or in other words, a pinch-out. As illustrated in FIG. 18A, in the case of performing a pinch-out such that the wind information Wj spreads both to the left or right and in the outward direction, the controller 110 adjusts the wind direction to the left or right and the wind direction in the outward direction of the air outlet. In other words, according to an input operation by the user, the controller 110 adjusts the angles of the vertical flap 340 and the horizontal louver 350 and also changes the wind information Wj like in FIG. 18B.

As above, the central management device 100 of Embodiment 3 is configured to switch between a collective wind direction operation with respect to multiple air outlets and an individual wind direction operation with respect to a single air outlet, depending on the presence or absence of a press-and-hold operation. In other words, the controller 110 discriminates between the collective wind direction operation with respect to multiple air outlets and the individual wind direction operation with respect to a single air outlet according to whether or not a press-and-hold operation exists. More specifically, if the user performs a press-and-hold operation when starting an operation, the controller 110 enters an individual operation mode that individually operates the wind direction settings at the position of the long-press. Additionally, if the user goes on to perform a slide operation after the individual operation mode is entered, it becomes possible to move or expand the wind information Wj inside the range information Wr. Furthermore, wind direction control of the air outlet based on the moved or expanded wind direction Wj may be performed.

Consequently, according to the central management device 100 of Embodiment 3, since finger wind direction operations may be achieved, an improvement in user convenience and ease-of-use may be attained. For example, it is possible to perform operations in stages in which, after performing a collective wind direction operation with respect to multiple air outlets and setting the wind direction roughly, an individual wind direction is performed with respect to a single air outlet to make fine adjustments. In other words, the user is able to perform fine-grained operations easily, without performing a separate operation of changing the operation mode. Note that in the case in which the pointing device of the central management device 100 is a touch panel, the operation of sliding a finger after a long-press corresponds to a "drag".

Embodiment 4

Since the configuration of the air conditioning system according to Embodiment 4 is similar to the configuration of Embodiment 1, for component members that are similar to Embodiments 1 to 3, the same signs will be used and the description will be omitted. In the air conditioning system 10 of Embodiment 4, the remote controller 400 has functions similar to the central management device 100. The remote controller 400 in Embodiment 4 corresponds to the "control apparatus" of the present invention.

Figure 19:
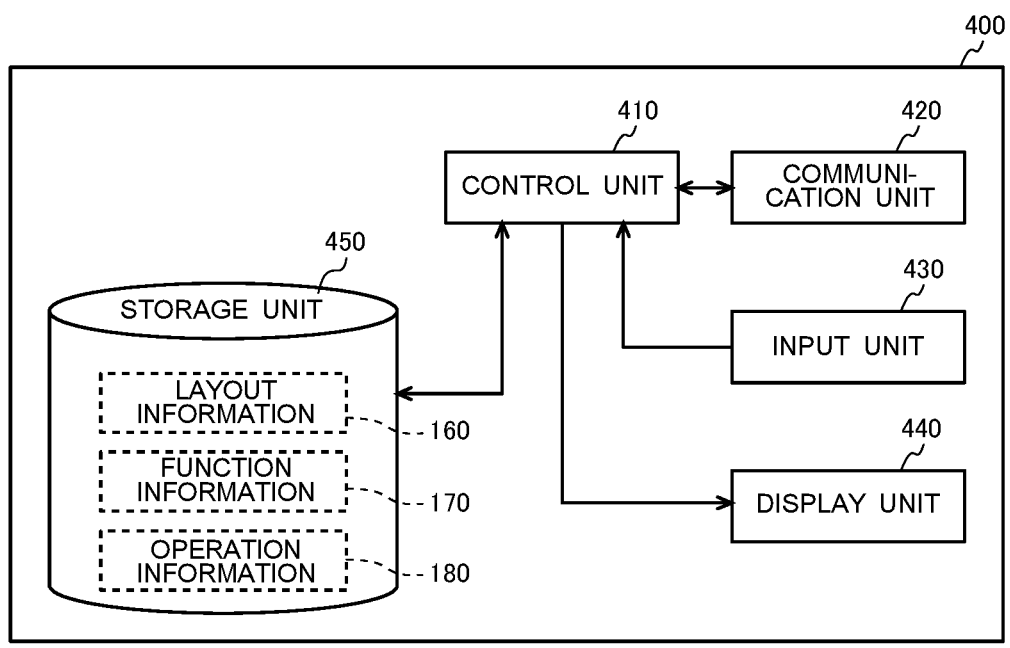
FIG. 19 is a block diagram illustrating an exemplary functional configuration of a remote controller of an air conditioning system according to Embodiment 4 of the present invention.

FIG. 19 is a block diagram illustrating an exemplary functional configuration of a remote controller of an air conditioning system according to Embodiment 4 of the present invention. The remote controller 400 in Embodiment 4 includes a controller 410, a communication unit 420, an input unit 430, a display unit 440, and a storage unit 450. Additionally, the controller 410 is configured similarly to the controller 110 of the central management device 100 in Embodiments 1 to 3. Also, each of the communication unit 420, the input unit 430, the display unit 440, and the storage unit 450 is configured similarly to the communication unit 120, the input unit 130, the display unit 140, and the storage unit 150 of the central management device 100 in Embodiments 1 to 3, respectively.

Thus, through the remote controller 400, the user is able to perform collective wind direction control with respect to multiple air outlets. In other words, by receiving an operation specifying the reach position of wind blown out from two or more air outlets in association with the layout screen L, it is possible to control the wind direction of multiple air outlets with a single operation, thereby making it possible to achieve collective wind direction control with respect to multiple air outlets. Other effects are similar to Embodiments 1 to 3. Note that the remote controller 400 may also be configured to perform wind direction control in cooperation with the central management device 100.

Embodiment 5

Figure 20:
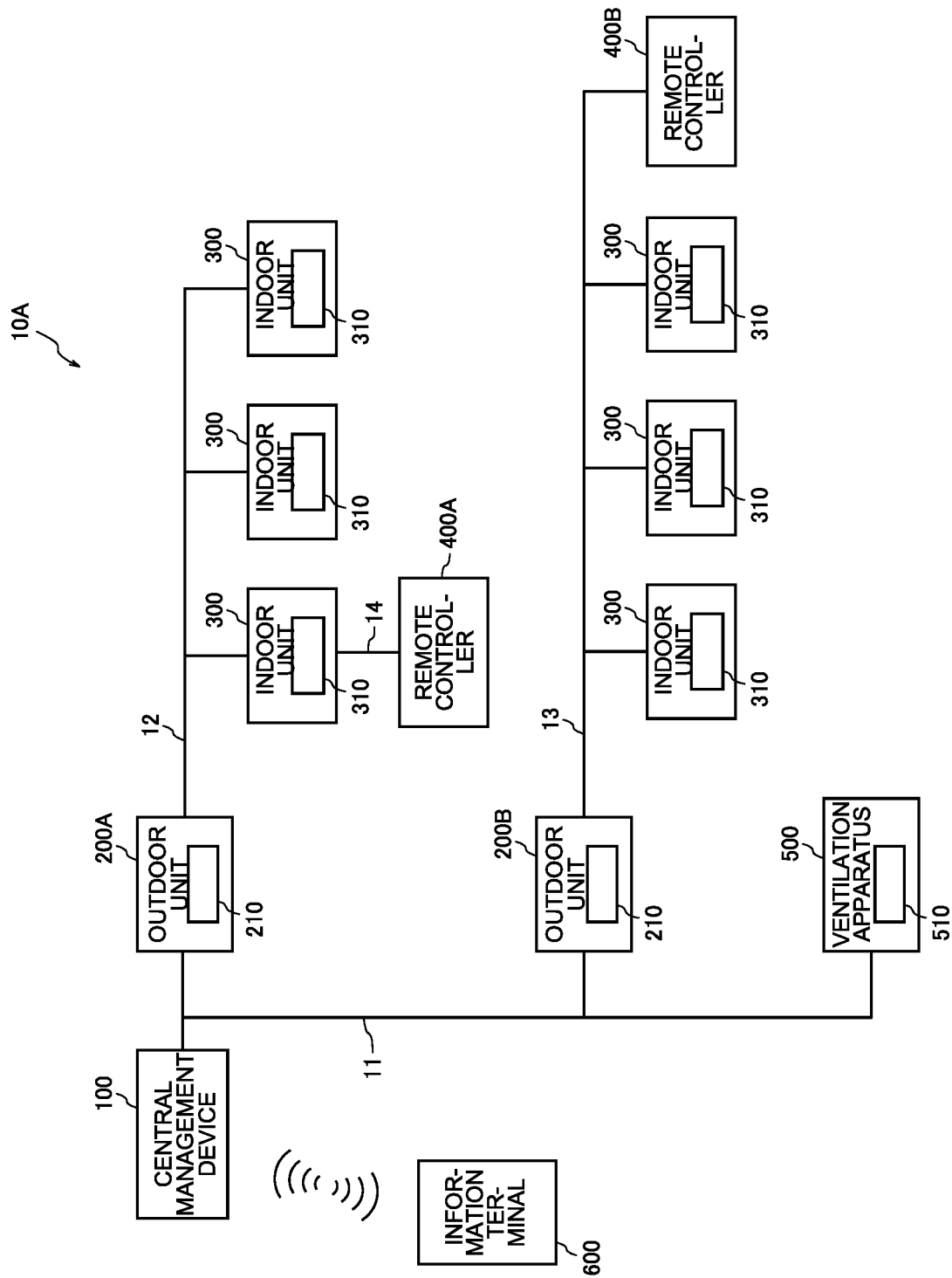
FIG. 20 is a block diagram illustrating an exemplary configuration of an air conditioning system according to Embodiment 5 of the present invention.

FIG. 20 is a block diagram illustrating an exemplary configuration of an air conditioning system according to Embodiment 5 of the present invention. In the air conditioning system 10A of Embodiment 5, an information terminal 600 wirelessly connected to the central management device 100 has functions similar to the central management device 100. Since the rest of the configuration of the air conditioning system 10A according to Embodiment 5 is similar to the configuration of Embodiment 1, for component members that are similar to Embodiments 1 to 4, the same signs will be used and the description will be omitted.

The information terminal 600 is an apparatus that the user is able to carry around, such as a tablet personal computer (PC), a smartphone, a mobile phone, a personal digital assistant (PDA), or a notebook PC, for example. The information terminal 600 has a function of communicating information according to any communication standard such as Bluetooth (registered trademark; the same applies hereinafter), wireless LAN including Wi-Fi (registered trademark; the same applies hereinafter), or Zigbee (registered trademark; the same applies hereinafter). The information terminal 600 is able to communicate wirelessly with the central management device 100.

Assume that the information terminal 600 has downloaded and installed an air conditioning control program 190 for causing the information terminal 600 to function as a controller for controlling multiple air conditioners from an external server (not illustrated) over a network. The external server is configured as a cloud server based on cloud computing or a physical server such as a web server, and stores and manages the air conditioning control program 190. By installing the air conditioning control program 190, the information terminal 600 is able to cooperate with the central management device 100 and perform actions such as remotely operating multiple air conditioners. The information terminal 600 corresponds to the "control apparatus" of the present invention.

Figure 21:
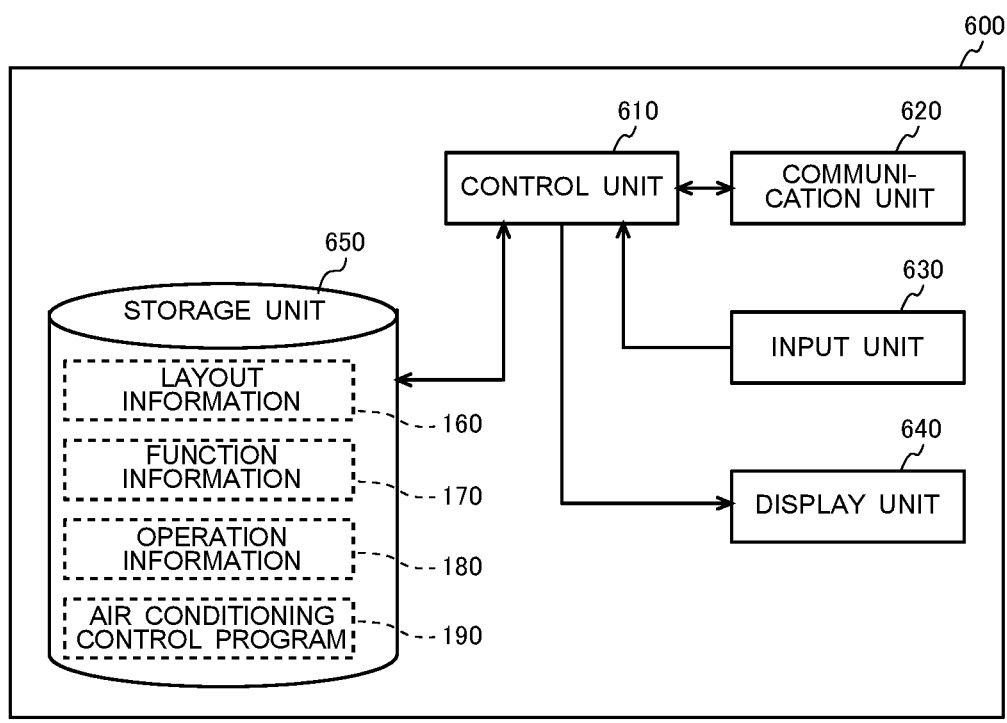
FIG. 21 is a block diagram illustrating an exemplary functional configuration of the information terminal of FIG. 20.

FIG. 21 is a block diagram illustrating an exemplary functional configuration of the information terminal of FIG. 20. The information terminal 600 includes a controller 610, a communication unit 620, an input unit 630, a display unit 640, and a storage unit 650. Additionally, the controller 610 functions similarly to the controller 110 of the central management device 100 in Embodiments 1 to 3. Also, each of the communication unit 620, the input unit 630, the display unit 640, and the storage unit 650 is configured similarly to the communication unit 120, the input unit 130, the display unit 140, and the storage unit 150 of the central management device 100 in Embodiments 1 to 3, respectively.

Thus, through the information terminal 600, the user is able to perform collective wind direction control with respect to multiple air outlets. In other words, by receiving an operation specifying the reach position of wind in association with the layout screen L, it is possible to control the wind direction of multiple air outlets with a single operation, thereby making it possible to achieve collective wind direction control with respect to multiple air outlets. Other effects are similar to Embodiments 1 to 4.

Embodiment 5 illustrates an example of a case in which the information terminal 600 communicates wirelessly with the central management device 100, but the configuration is not limited thereto, and the information terminal 600 may also be configured to communicate wirelessly with the remote controller 400. Additionally, the information terminal 600 may also be configured to communicate with the central management device 100 through the remote controller 400.

Each of Embodiments 1 to 5 described above is a preferred specific example of the control apparatus and the air conditioning system, but the technical scope of the present invention is not limited to these modes. For example, each of Embodiments 1 to 5 above illustrates an example of a case in which the length in the D direction of the wind information Wj corresponds to the angle setting of the vertical flap 340, but the configuration is not limited thereto, and the length in the D direction of the wind direction Wj may also indicate at least one of the angle setting of the vertical flap 340 and the rotation speed of the fan 330. In other words, the controllers 110, 410, and 610 may be configured to control at least one of the wind direction and the wind volume of two or more air outlets based on information indicating the reach position received by the input unit 130, the arrangement information, and the function information. In this case, the wind information Wj is information indicating the currently set wind direction and the wind direction.

For example, in the case in which the length in the D direction of the wind information Wj indicates the rotational frequency of the fan 330, the length in the D direction of the wind information Wj corresponds to the wind volume of the air outlets. In other words, the length in the direct wind direction D of the wind information Wj corresponds to the control of the fan 330 by the controllers 110, 410, and 610. Also, in the case in which the length in the D direction of the wind information Wj indicates the angle setting of the vertical flap 340 and the rotational frequency of the fan 330, the length in the D direction of the wind information Wj corresponds to the wind direction and the wind volume in the direct wind direction D. In other words, the length in the direct wind direction D of the wind information Wj corresponds to the control of the vertical flap 340 and the fan 330 by the controllers 110, 410, and 610. In other words, the controllers 110, 410, and 610 may also be configured to adjust the angle of the horizontal louver 350 in association with the width to the left and right of the wind information Wj, and adjust at least one of the angle of the vertical flap 340 and the rotational frequency of the fan 330 in association with the length in the direct wind direction D of the wind information Wj.

With this arrangement, by receiving an operation specifying a reach position of the wind in association with the layout screen L, it is possible to control the wind blown out from multiple air outlets with a single operation, thereby making it possible to achieve collective wind direction control and wind volume control with respect to multiple air outlets.

FIG. 3 and similar diagrams illustrate an example of a case in which the range information Wr is displayed as a trapezoidal region, but the configuration is not limited thereto, and the range information Wr may also be configured to be displayed as a fan-shaped, elliptical, or parabolic region that is convex on the side of the icon S.

FIG. 3 and similar diagrams illustrate an example of a case in which a layout diagram is included on the layout screen L, but the configuration is not limited thereto, and the layout screen L does not have to include a layout diagram. However, if the layout screen L is configured to include a layout diagram, it is possible to enable the user to see features such as the partitions of rooms, thereby improving ease-of-use. Similarly, the layout screen L does not have to include the range information Wr. However, if the layout screen L is configured to include the range information Wr, the user is able to perform input operations for adjusting the wind direction more precisely.

Embodiments 1 to 5 above illustrate an example of a case of performing input operations with a finger, but the configuration is not limited thereto, and input operations may also be performed with an implement such as a touch pen. Additionally, the input units 130, 430, and 630 may also be a pointing device such as a touch pad or a trackball. In other words, it is sufficient for the input units 130, 430, and 630 to have the functionality of a pointing device that receives input operations. In addition, the input units 130, 430, and 630 may also be an input port such as a USB port that receives input operations through a device such as a mouse. In other words, the input unit 130 and display unit 140, the input unit 430 and display unit 440, and the input unit 630 and display unit 640 may also be configured separately.

FIGS. 1 and 20 illustrate an example of a case in which the air conditioning systems 10 and 10A include two outdoor units 200 and six indoor units 300, but the combination of the number of outdoor units 200 and the number of the indoor units 300 is not limited thereto. Also, FIGS. 1 and 20 illustrate a single ventilation apparatus 500 as an example, but the configuration is not limited thereto, and the air conditioning systems 10 and 10A may also include multiple ventilation apparatus 500.

FIG. 1 illustrates an example of a case in which facility apparatus such as the outdoor unit 200, the indoor unit 300, the remote controller 400, and the ventilation apparatus 500 are connected to the central management device 100, but the configuration is not limited thereto. For example, as the "air conditioner" of the present invention, an apparatus such as an integrated air conditioner combining the functions of an indoor unit and the functions of an outdoor unit, an air purifier that removes particles such as dust floating in the air, or a humidifier that humidifies the air in the air-conditioning target space may also be connected to the central management device 100. In addition, facility apparatus such as a water heater, a floor heater, a television, a digital television, a DVD recorder, a stereo, and lighting apparatus may also be connected to the central management device 100, and these apparatus may be operated through the central management device 100.

FIG. 3 and similar diagrams illustrate an example of ceiling-concealed cassette four-directional indoor units 300, but the indoor units 300 may also be ceiling-concealed cassette two-directional indoor units or ceiling-concealed cassette one-directional indoor units. Also, the indoor units 300 are not limited to being ceiling-concealed, and may also be wall-mounted or floor-standing indoor units.

FIGS. 1 and 20 illustrate an example of a case in which the remote controllers 400A and 400B are connected to equipment such as the indoor units 300 in a wired manner, but the configuration is not limited thereto, and the remote controllers 400A and 400B may also be connected to equipment such as the indoor units 300 wirelessly.

The invention claimed is:

1. A control apparatus that controls at least one of a wind direction and a wind volume of a plurality of air conditioners provided with air outlets, comprising:
 a storage unit configured to store arrangement information indicating an arrangement of each air conditioner and function information indicating a function of each air conditioner;
 a display unit configured to display a layout screen including the arrangement information;
 an input unit configured to receive an operation specifying a reach position of wind blown out from two or more of the air outlets in association with the layout screen; and
 a controller configured to control at least one of the wind direction and the wind volume of two or more of the air outlets based on the information indicating the reach position received by the input unit, the arrangement information, and the function information,
 wherein
 the controller is configured to reflect information indicating a range of reach of wind blown out from each of the air outlets on the layout screen displayed on the display unit, the information indicating the reach position is information indicating a continuous path including a start point and an end point, each of a plurality of rooms is provided with one or a plurality of the air conditioners, the storage unit further stores zone information partitioning each of the rooms into zones, and in a case of determining that the information indicating the path drawn across two or more rooms based on the zone information, the controller reflects an air-sending state of the air outlet associated with the information indicating the range of reach of wind where the start point of the information indicating the path is positioned on the air-sending state of the air outlets each associated with pieces of other information indicating the range of reach of wind overlapping the path.

2. The control apparatus of 1, wherein
based on the information indicating the reach position, the arrangement information, and the function information, the controller sets control content for two or more of the air outlets and displays, on the display unit, wind information indicating the set control content in association with the arrangement information.

3. The control apparatus of claim 1, wherein
the controller is configured to reflect information indicating the first range of the air outlets on the layout screen displayed on the display unit.

4. The control apparatus of claim 3, wherein
the controller is configured to control at least one of the wind direction and the wind volume of two or more of the air outlets according to a positional relationship between the range indicated by the information indicating the first range and the position indicated by the information indicating the reach position.

5. The control apparatus of claim 3, wherein
the controller is configured to display the information indicating the first range as a trapezoidal region on the display unit.

6. The control apparatus of claim 3, wherein
the information indicating the reach position is information indicating a continuous path including a start point and an end point.

7. The control apparatus of claim 6, wherein
in a case in which the information indicating the path is information indicating a ring shape in which the start point and the end point are the same, the controller controls at least one of the wind direction and the wind volume of two or more of the air outlets targeting an inside of the ring shape.

8. The control apparatus of claim 6, wherein
the controller extracts data indicating the second range from among the information indicating the path as section data, and based on the extracted section data, controls at least one of the wind direction and the wind volume of two or more of the air outlets, and
the second range overlaps with the first range.

9. The control apparatus of claim 8, wherein
each of a plurality of rooms is provided with one or a plurality of the air conditioners, the storage unit further stores zone information partitioning each of the rooms into zones, and in a case of determining that the information indicating the path drawn across two or more rooms based on the zone information, the controller extracts the section data from the information indicating the path after first removing all portions not inside the room that includes the start point.

10. The control apparatus of claim 9, wherein
the controller is configured to reflect the zone information on the layout screen displayed on the display unit.

11. The control apparatus of claim 6, wherein
in a case in which a press-and-hold operation is performed on the start point to the input unit, the controller controls at least one of the wind direction and the wind volume of the air outlet associated with a location of the start point.

12. The control apparatus of claim 1, wherein
the input unit and the display unit are stacked on top of each other to form a touch panel.

13. An air conditioning system comprising:
a plurality of air conditioners; and
the control apparatus of claim 1.

14. The air conditioning system of claim 13, wherein
at least one of the plurality of air conditioners includes two or more of the air outlets.

15. The air conditioning system of claim 13, wherein
each air conditioner includes a vertical flap that adjusts the direction of wind in a vertical direction and a horizontal louver that adjusts the direction of wind in a horizontal direction, and when adjusting the wind direction of the air outlets, the controller adjusts an angle of at least one of the vertical flap and the horizontal louver.

16. The air conditioning system of claim 13, wherein
each air conditioner includes a fan that adjusts the wind volume of the air outlets, and when adjusting the wind volume of the air outlets, the controller adjusts a rotation speed of the fan.

17. An air conditioning system comprising:
a plurality of air conditioners;
a central management device that controls the air conditioners in a centralized manner; and
the control apparatus of claim 1 that communicates with the central management device in a wired or wireless manner, wherein
the controller controls the plurality of air conditioners through the central management device.

18. A control apparatus that controls at least one of a wind direction and a wind volume of a plurality of air conditioners provided with air outlets, comprising:
a storage unit configured to store arrangement information indicating an arrangement of each air conditioner and function information indicating a function of each air conditioner;
a display unit configured to display a layout screen including the arrangement information;
an input unit configured to receive an operation specifying a reach position of wind blown out from two or more of the air outlets in association with the layout screen; and
a controller configured to control at least one of the wind direction and the wind volume of two or more of the air outlets based on the information indicating the reach position received by the input unit, the arrangement information, and the function information,
wherein
the controller is configured to reflect information indicating a range of reach of wind blown out from each of the air outlets on the layout screen displayed on the display unit,
the information indicating the reach position is information indicating a continuous path including a start point and an end point, in a case in which air-sending from the air outlet associated with the information indicating the range of reach of wind where the start point is positioned is stopped, the controller sets the air-sending state of the air outlets associated with all pieces of the information indicating the range of reach of wind overlapping the path indicated by the path information to a running state, and in a case in which air-sending from the air outlet associated with the information indicating the range of reach of wind where the start point is positioned is being executed, the controller sets the air-sending state of the air outlets associated with all pieces of the information indicating the range of reach of wind overlapping the path indicated by the path information to a stopped state.

* * * * *